US009142081B1

(12) United States Patent
Conklin et al.

(10) Patent No.: US 9,142,081 B1
(45) Date of Patent: Sep. 22, 2015

(54) DYNAMIC AWARDING OF PRIZES IN CHANCE-BASED CONTESTS

(75) Inventors: Gregory J. Conklin, Pleasanton, CA (US); Alison Allgor, Seattle, WA (US); David Crawford, New York, NY (US); Naresh Dhiman, Snoqualmie, WA (US); Jeffrey Alan Holden, Chicago, IL (US); Shafiq Shariff, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 13/436,461

(22) Filed: Mar. 30, 2012

Related U.S. Application Data

(60) Provisional application No. 61/471,017, filed on Apr. 1, 2011.

(51) Int. Cl.
*A63F 13/00* (2014.01)
*G07F 17/32* (2006.01)

(52) U.S. Cl.
CPC .................................... *G07F 17/32* (2013.01)

(58) Field of Classification Search
USPC ...................... 463/9, 16–43; 273/40; 709/204
See application file for complete search history.

(56) References Cited

U.S. PATENT DOCUMENTS

| | | | | |
|---|---|---|---|---|
| 6,532,448 | B1 * | 3/2003 | Higginson et al. | 705/14.14 |
| 6,636,892 | B1 * | 10/2003 | Philyaw | 709/217 |
| 7,392,285 | B2 * | 6/2008 | Philyaw | 709/204 |
| 2009/0036188 | A1 * | 2/2009 | Gelman | 463/16 |

* cited by examiner

*Primary Examiner* — Sunit Pandya
(74) *Attorney, Agent, or Firm* — Alston & Bird LLP

(57) ABSTRACT

Techniques are described for facilitating the awarding of prizes in chance-based contests in various ways, such as chance-based contests which are part of promotional advertising, etc. In at least some embodiments, the techniques include facilitating the awarding of prizes at the time a contestant enter or plays the contests, while awarding a selected number of prizes, which may be determined before the contest starts. In at least some embodiments, the techniques include employing an award counter to control awarding of prizes in a chance-based contest. For example, an award counter may be incremented at random or pseudo-random times. In at least some embodiments, the contest is associated with a location-based virtual group of users that has one or more associated geographical areas.

41 Claims, 14 Drawing Sheets

FIG. 5F
JENNIFER STEVENS
FEMALE
HEIGHT: 5'6"
AGE: 24
I'M HERE TO MEET NEW PEOPLE,
SO STOP BY AND SAY HI!
1
SEND MESSAGE TO JENNIFER
2
ADD JENNIFER TO FAVORITE PEOPLE
3
INVITE JENNIFER TO BE A FRIEND
4
REVEAL LOCATION TO JENNIFER

DYNAMIC AWARDING OF PRIZES IN CHANCE-BASED CONTESTS

CROSS REFERENCE TO RELATED APPLICATIONS

This application claims the benefit of provisional U.S. Patent Application No. 61/471,017, filed Apr. 1, 2011 and entitled "Dynamic Awarding of Prizes in Chance-Based Contests," which is hereby incorporated by reference in its entirety.

TECHNICAL FIELD

The following disclosure relates generally to techniques for facilitating awarding prizes in contests, such as techniques for facilitating awarding of prizes in chance-based contests.

BACKGROUND

Chance-based contests typically take two forms. In one form, contest prizes may be awarded at the time a contestant plays. The chances of winning are fixed (for example, 100:1). An advantage of this form of awarding chance-based contest prizes is that there typically may be some instant gratification since a contestant may know whether they won or lost at the time of entry.

In another form, contest prizes may be awarded at the end of the contest. The chance of winning depends on the number of prizes, which may typically be fixed, and the number of contestants, which may typically be variable. An advantage of this form of awarding chance-based contest prizes is that the cost to run the contest typically may be known in advance since a known number of prizes typically may be awarded.

DETAILED DESCRIPTION

Techniques are described for facilitating the awarding of prizes in chance-based contests in various ways, such as chance-based contests which are part of promotional advertising, etc. In at least some embodiments, the techniques include facilitating the awarding of prizes at the time a contestant enter or plays the contests, while awarding a selected number of prizes, which may be determined before the contest starts. In at least some embodiments, the techniques include employing an award counter to control awarding of prizes in a chance-based contest. For example, an award counter may be incremented at random or pseudo-random times. A random or pseudo-random time may be used facilitate the chance-based nature of a contest. When a contestant plays, determining whether a prize is to be awarding may be based on a value of the award counter. For example, if a value of an award counter is not zero when a contestant plays, a prize may be awarded and the counter value decremented, while if the value of the award counter is zero, no prize is awarded. In addition, in at least some embodiments, the described techniques are automatically performed by an embodiment of a Contest Management system, as described in greater detail below.

Figure 1:
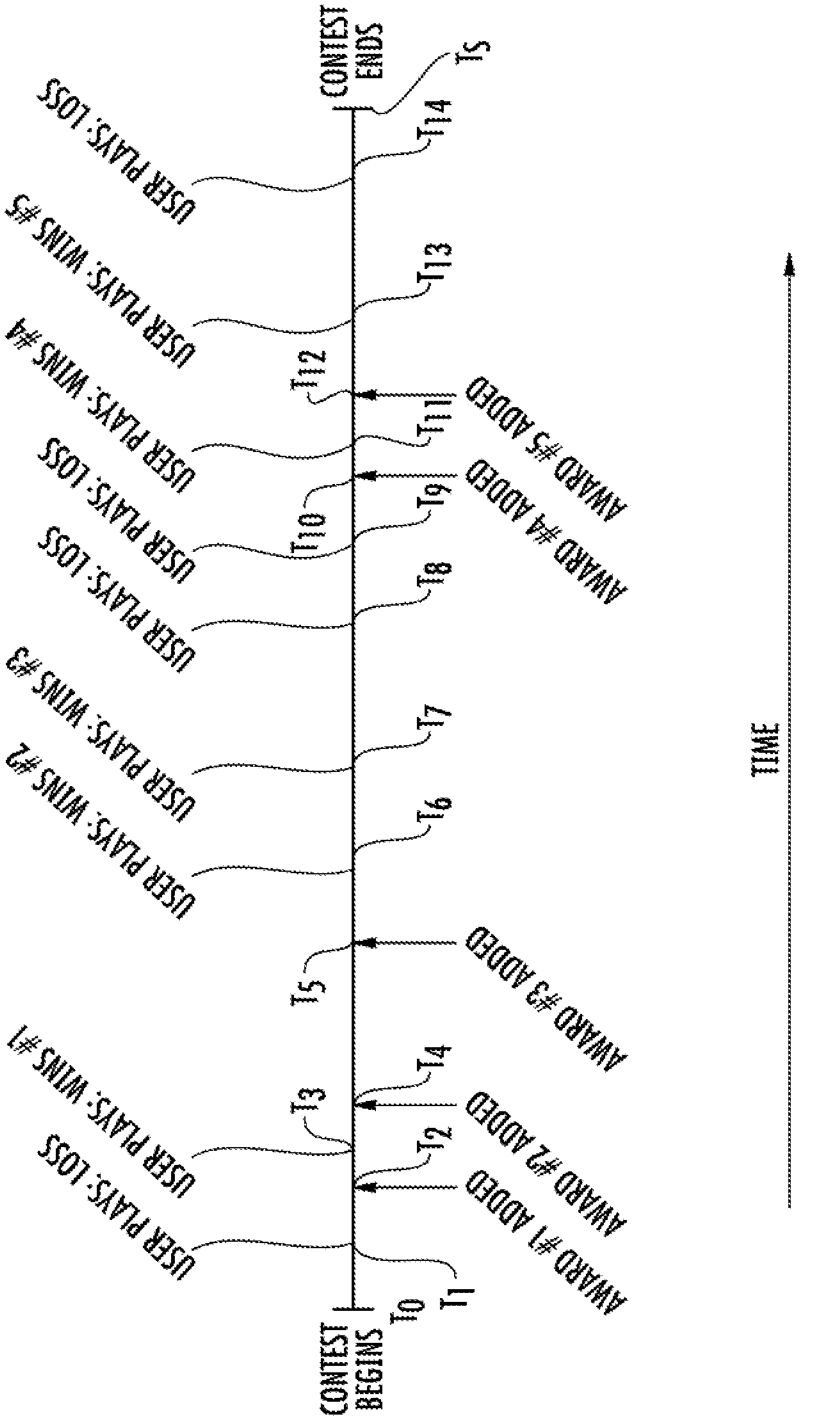
FIG. 1 is an example timeline for an embodiment of a chance-based contest employing an award counter.

FIG. 1 illustrates an example timeline for an embodiment of a chance-based contest using an award counter to control awarding of prizes. The contest begins at time $T_0$, with the award counter initialized to a value, for example, to a value of zero. At time $T_1$, a user such as a contestant plays, for example, by submitting an entry. No awards have been added, thus the award counter has a zero value and the user does not win a prize. At time $T_2$, award number 1 is added and the award counter is incremented from zero to one. At time $T_3$, a user plays and because the award counter is not zero, award number 1 is awarded to the user and the value of the award counter is decremented from one to zero. At time $T_4$, award number 2 is added and the award counter is incremented from zero to one. At time $T_5$, award number 3 is added and the award counter is incremented from one to two. At time $T_6$, a user plays and because the award counter is not zero, award number 2 is awarded to the user and the value of the award counter is decremented from two to one. At time $T_7$, a user plays and because the award counter is not zero, award number 3 is awarded to the user and the value of the award counter is decremented from one to zero. At time $T_8$, a user plays and because the award counter is zero, no prize is awarded. At time $T_9$, a user plays and because the award counter is zero, no prize is awarded. At time $T_{10}$, award number 4 is added and the award counter is incremented from zero to one. At time $T_{11}$, a user plays and because the award counter is not zero, award number 4 is awarded to the user and the value of the award counter is decremented from one to zero. At time $T_{12}$, award number 5 is added and the award counter is incremented from zero to one. At time $T_{13}$, a user plays and because the award counter is not zero, award number 5 is awarded to the user and the value of the award counter is decremented from one to zero. At time $T_{14}$, a user plays and because the award counter is zero, no prize is awarded. At time $T_S$, the contest stops.

An award counter may be implemented in various manners. For example, creating a contest of an embodiment may include creating a contest-definition database which stores contest-definition information, such as a start time, an end time, a number of awards, types of awards, redemption conditions, etc. The stored information may be based on user input, such as input from a contest administrator user, or calculated or otherwise determined, or combinations thereof. For example, an award counter may be implemented by determining and recording times when the award counter will be incremented in the database, and the database may be accessed or referenced while the contest is running (e.g., to determine whether to increment an award counter while the contest is running or to determine a value of an award counter). For example, when N prizes are to be awarded, N time points that are randomly or pseudo-randomly distributed between a start time and an end time may be determined and stored in the database, and the N time points used to control incrementing of the award counter. In an embodiment, techniques may be employed to cause or to verify that a distribution of the time points between the start and end time is approximately even, such as techniques to avoid or to detect and address clusters. In an embodiment, an explicit award counter mechanism or routine may be implemented that is incremented at the determined times. In an embodiment, a value of the award counter may be calculated at a time a contestant plays the contest using the determined times and the number of previously awarded prizes.

In an embodiment, an award counter may be incremented based on a calculated probability at certain times during a contest. For example, at certain times a probability may be calculated, and the calculated probability used to determine whether to increment the award counter. Some non-limiting examples of using determined or calculated probabilities to determine whether increment an award counter include: determining or calculating a probability of receiving entries during selected time periods, determining or calculating a probability of awarding too few prizes, determining or calculating a probability of running out of prizes, and using the determined or calculate probability to determine whether to increment an award counter. These examples are described in more detail below.

In an embodiment, incrementing of an award counter may be based on other information, such as information stored in a contest definition database or information received or determined during a contest. For example, incrementing of an award counter may account for non-uniform award times, such as non-uniform entry times. For example, if a contest prize to be awarded is free gasoline for those who visit a gas station, and the award counter is allowed to increment during the night when the gas station is closed, the award counter may grow overnight since no one had a chance to play and win during the night. Contestants who enter in the morning when the gas station opens might have a higher chance of winning than contestants who enter later in the day. Similarly, certain business hours may be known to have a lower level of customer traffic that other business hours. To address such situations, in an embodiment the award counter may be incremented with different probabilities (lower and/or higher than normal) during different time periods of the contest. For example, during certain time periods the probability of receiving an entry may be low or zero during certain time periods (e.g., overnight when a merchant location where entries may be submitted is closed), and thus a probability of an award counter incrementing during such a time period may be zero or lower than a probability at other time periods.

In an embodiment, multiple award counters may be employed. For example, it may be desirable in some contests to allow some or all contestant users to submit multiple entries within a short time period. When a single award counter is employed, a contestant user who submits multiple entries within a short time period and loses on the first entry may have a likelihood of winning on subsequent entries of the multiple entries that is lower than desired. In another example, it may be desirable to allow some or all contestant users to submit multiple entries at the same time, for example, if a contestant user qualifies for such treatment (such as through earned award points, as discussed in more detail below). Multiple award counters may be employed to facilitate multiple-entry situations. These award counters may operate in a manner similar to the single award-counter scenario, with a total number of counter increments for a contest distributed among the award counters equal to a total number of prizes to be awarded. When a contestant user enters the contest, one of the award counters may be selected for the contestant user's entry. For example, one of the award counters may be selected randomly, pseudo-randomly, sequentially, using an algorithm, etc. For example, when a contestant user submits two entries within a certain time period or at the same time, an award counter employed for the first entry may be excluded from the selection process for the second entry by the contestant user. Probability parameters may be employed in determining a distribution of the total number of awards among the counters. For example, if one counter is selected for first entries received from contestant users, and a second counter is selected for subsequent entries received from contestant users who have previously submitted a first entry, a probability of contestant users submitting multiple entries may be employed in determining a distribution of awards among the award counters. In some embodiments, multiple award counters may be employed which have different probabilities of incrementing and different probabilities of being selected, including award counters having different probabilities of incrementing or of being selected in different time periods.

Figure 2:
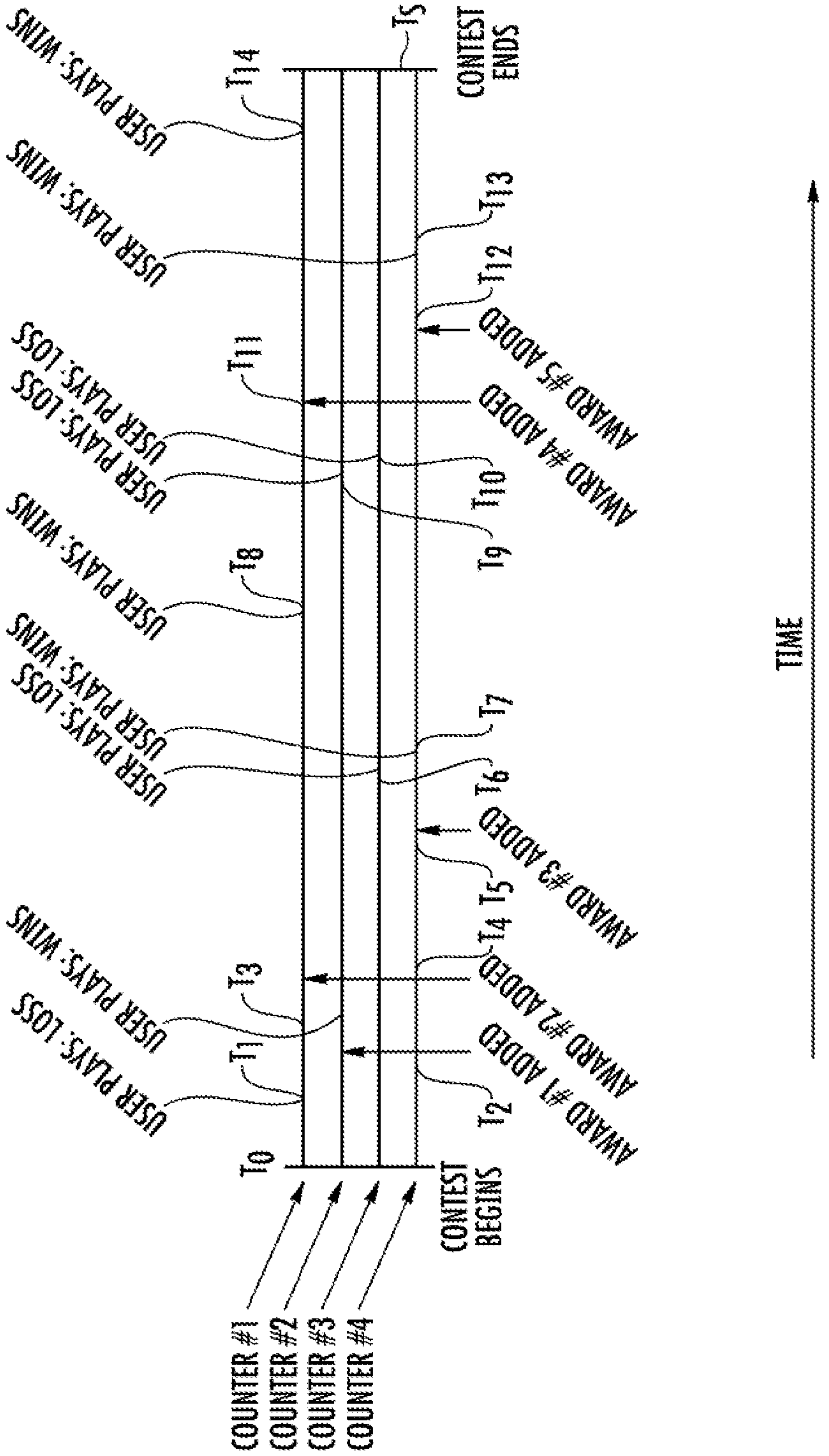
FIG. 2 is an example timeline for an embodiment of a chance-based contest employing multiple award counters.

FIG. 2 illustrates an example timeline for an embodiment of a chance-based contest using multiple award counters to control awarding of prizes. In the embodiment as illustrated in FIG. 2, the award counters employed to determine whether to award a prize are selected sequentially. As discussed elsewhere herein, other methods of selecting an award counter to employ in determining whether to award a prize may be employed. The contest begins at time $T_0$, with each award counter initialized to, for example, a zero value. At time $T_1$, a user such as a contestant plays and award counter number 1 is selected to determine whether the user has won. No awards have been added to award counter number 1, thus award counter number 1 has a zero value and the user does not win a prize. At time $T_2$, award number 1 is added to award counter number 2, and award counter number 2 is incremented from zero to one. At time $T_3$, a user plays and award counter number 2 is selected to determine whether the user has won. Because award counter number 2 is not zero, award number 1 is awarded to the user and the value of the award counter number 2 is decremented from one to zero. At time $T_4$, award number 2 is added to award counter number 1 and award counter number 1 is incremented from zero to one. At time $T_5$, award number 3 is added to award counter number 4 and award counter number 4 is incremented from zero to one. At time $T_6$, a user plays and award counter number 3 is selected to determine whether the user has won. Because award counter number 3 is zero, the user does not win. At time $T_7$, a user plays and award counter number 4 is selected to determine whether the user has won. Because award counter number 4 is not zero, award number 3 is awarded to the user and the value of award counter number 4 is decremented from one to zero. At time $T_8$, a user plays and award counter number 1 is selected to determine whether the user has won. Because award counter number 1 is not zero, award number 2 is awarded to the user and the value of award counter number 1 is decremented from one to zero. At time $T_9$, a user plays and award counter number 2 is selected to determine whether the user has won. Because award counter number 2 is zero, no prize is awarded. At time $T_{10}$, a user plays and award counter number 3 is selected to determine whether the user has won. Because award counter number 3 is zero, no prize is awarded.

At time $T_{11}$, award number 4 is added to award counter number 1, and award counter number 1 is incremented from zero to one. At time $T_{12}$, award number 5 is added to award counter number 4, and award counter number 4 is incremented from zero to one. At time $T_{13}$, a user plays and award counter number 4 is selected to determine whether the user has won. Because award counter number 4 is not zero, award number 5 is awarded to the user and the value of the award counter number 4 is decremented from one to zero. At time $T_{14}$, a user plays and award counter number 1 is selected to determine whether the user has won. Because award counter number 1 is not zero, award number 4 is awarded to the user and the value of award counter number 1 is decremented from one to zero. At time $T_S$, the contest stops.

In some embodiments, contestants who win prizes may be asked to take actions to redeem awarded prizes, such as presenting the entry or an award certificate to someone responsible for distributing prizes within a certain time period, joining a cloud (discussed in more detail below), etc. In some embodiments, contestant users may be notified of the conditions and take actions related to redemption of awards, such as verifying that an award was made, verifying that a redemption was timely, releasing unclaimed awards for adding back to the contest, etc. For example, a timer may be started when a contestant wins an award. If the contestant does not redeem the award within a specified period of time (e.g., 15 minutes, 30 minutes, 2 days, etc.), data in a contest information database may be updated to reflect that the awarded prize is no longer redeemable, and the appropriate award counter may be incremented to reflect that the award has been added back into the contest.

In some embodiments, one or more actions may be taken to detect and address or reduce the likelihood of situations where not enough prizes are awarded. For example, a contest may be defined to award a determined number of prizes during a length of the contest. An award counter may be incremented late in the contest with no contestant user winning a prize based on the counter before the contest ends. In such a case, action may be taken to detect remaining prizes and award any such remaining prizes, such as randomly or pseudo-randomly selecting contestant users who previously entered the contest to receive awards. In some embodiments, the selected contestant users may be limited to contestants who did not previously win an award in the contest. In some embodiments, a probability of having remaining prizes at the end of a contest may be determined, for example, periodically or at determined times during the contest, and the probability of having remaining prizes at the end of the contest may be used to reduce the likelihood of having remaining prizes at the end of the contest and/or to facilitate complying with any rules for the contest. For example, when the probability of having remaining prizes at the end of the contest exceeds a threshold (which may vary, for example, based on when the probability is calculated), the contest may be modified to reduce the probability of having remaining prizes at the end of the contest, such as by changing to a fixed or calculated probability, adjusting award counter increment times, determining whether to award prizes based on an award counter and a probability factor, etc.

In some embodiments, one or more actions may be taken to detect and address or to reduce the likelihood of situations where the determined number of prizes is awarded before the contest ends. For example, a contest may be defined to award a determined number of prizes during a length of the contest. If all the counters are zero and it is known that no further counter increments will occur, all subsequent contestants will lose. In an embodiment, this situation may be detected and addressed by adding additional prizes and corresponding counter increment times. For example, with reference to FIG. 1, if the status of the contest is checked after time $T_{13}$ and before time $T_S$, it would be possible to detect a situation in which no prizes would be awarded for the remainder of the contest, for example by accessing databases such as contest definition and/or contest information databases and comparing the total number of prizes awarded to the total number of prizes to be awarded. In some embodiments, a number of additional prizes and a probability used to define increment times for the award counters may be based on a rate of contest entries and prizes awarded up until that point in the contest. In some embodiments, a fixed or calculated probability may be applied to subsequent entries after a determined number of prizes has been awarded (which may be a subset of the total number of prizes defined for the contest), after a determined time, etc. In some embodiments, a probability of running out of prizes may be determined, for example, periodically or at determined times during the contest, and the probability of running out of prizes during the contest may be used to reduce the likelihood of running out of prizes during the contest and/or to facilitate complying with any rules for the contest. For example, when the probability of running out of prizes early exceeds a threshold (a threshold which may vary, for example, based on when the probability is calculated), the contest may be modified to reduce the probability of running out of prizes, such as by changing to a fixed or calculated probability, determining whether to award prizes based on an award counter and a probability factor, etc.

Figure 3:
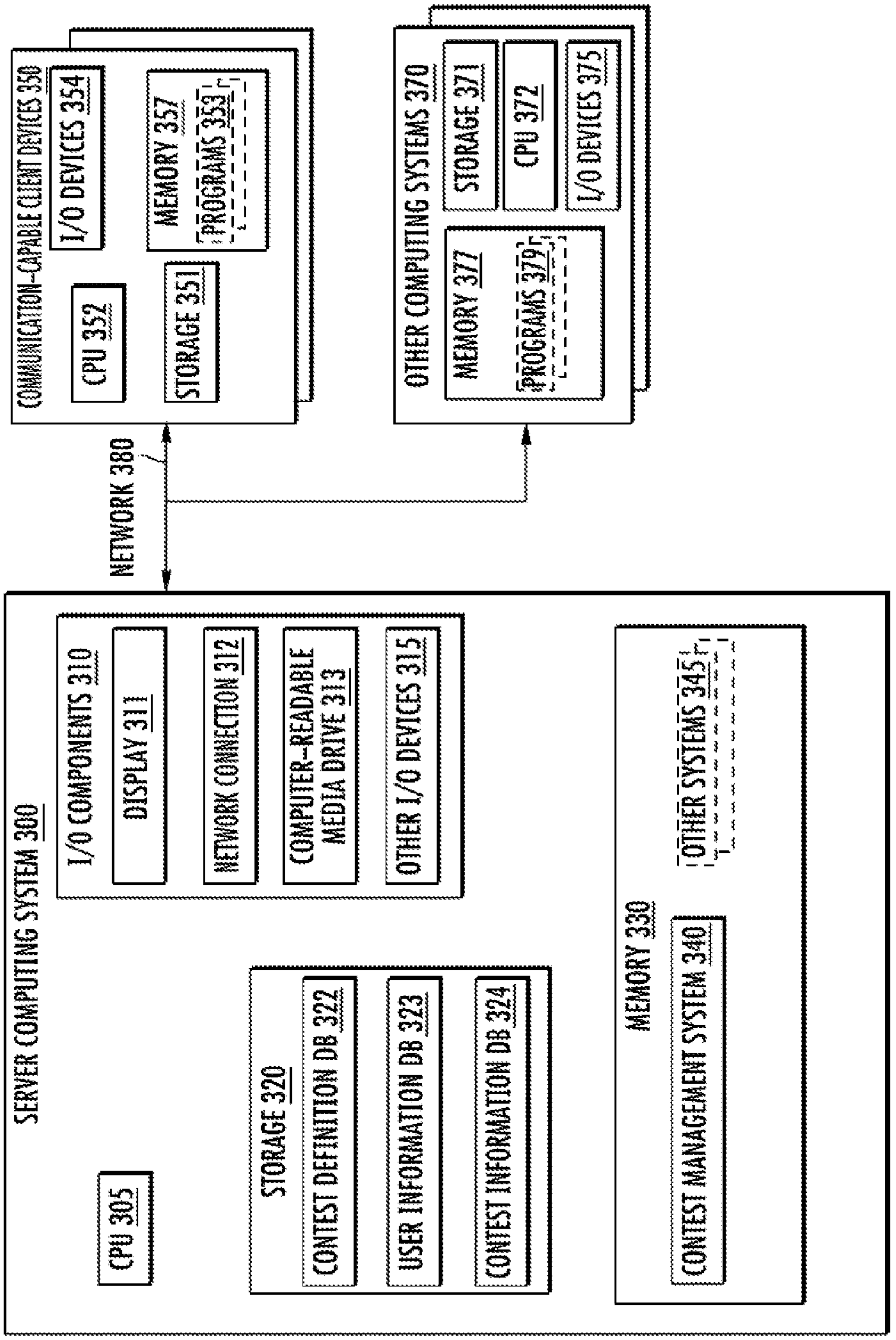
FIG. 3 is a block diagram illustrating a computing system suitable for executing an embodiment of the described Contest Management system.

FIG. 3 is a block diagram illustrating an embodiment of a server computing system 300 that is suitable for performing at least some of the described techniques, such as by acting as a central server to manage the creation and operation of chance-based contests, such as promotional contests, etc. The computing system 300 includes one or more central processing units ("CPU") processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, etc.).

In the illustrated embodiment, an embodiment of a Contest Management system 340 executes in memory 330 in order to perform at least some of the described techniques, such as to provide contest-related information and functionality to people and computing devices in various ways. The Contest Management system 340 in the illustrated embodiment includes software instructions that when executed by one or more of the processors configure the server computing system 300 to perform the described techniques. In particular, contest administrator users may interact with the Contest Management system 340 in order to define configuration information for contests and manage the contests, such as via I/O component 310, communication-capable client devices 350 and/or other computing systems 370. In addition, various communication-capable client devices 350 may interact with the Contest Management system 340, such as to provide contest information for the devices and/or information about users of the devices, so that the Contest Management system 340 can determine contests that are available to the devices and their users, and otherwise manage contests in the manners described elsewhere herein. In this example embodiment, contest definition information (e.g., associated businesses, associated clouds, redeeming locations and methods, start times, end times, counter increment times, counter increment probabilities, counter selection information, number of prizes to be awarded, etc.), user information (e.g., contestant user information, administrator user information, etc.) and information about contests (e.g., prizes awarded, current award counter values, etc.) are stored in databases ("DBs") 322-324 respectively on store 320, although such information may be stored in other manners in other embodiments. The other computing systems 370 and/or the client devices 350 may also perform other actions in some embodiments, such as to be operated by associated businesses, redeeming entities or contestants (e.g., to manage contests associated with a company, to enter a contest, to redeem an award, etc.).

One or more other systems 345 may also be optionally executing in memory 330 in this example, such as a payment processing system to handle fees and other payments for the Contest Management system, a search engine to provide search capabilities to users of devices 350 other than to indicate contest-related information, a system to analyze and generate various contest-related information (e.g., to determine patterns corresponding to users and related contests, such as to determine that contestants who enter certain contests within certain time periods are more likely to receive awards than users who enter at other time periods such that corrective action may be taken, if desired, to determine that contestants who enter contests are more likely to return to a particular redeeming location and make purchases, etc.), a system to identify various types of events of interest for contest promoters, contestants, etc., and to send corresponding notifications to such contest promoters, contestants, and/or to other users (e.g., to send notifications to past contestants or potential contestants when a new contest is announced; to send notifications to contest promoters when a specified type of activity happens for a contest, such as an award or a redemption of an award, an award rate different than an anticipated award rate; to send notifications of a contest to potential contestants; etc.). The devices 350 and systems 370 may each have one or more programs 353 and 379, respectively, executing in memory 357 and 377, respectively, to provide various functionality. For example, the programs 353 may include a Web browser or other client program (e.g., a client program specific to the Contest Management system) that a user may use to interact with the Contest Management system, such as a program that provides a graphical user interface to users in other to provide various functionality related to participation in or management of contests. Similarly, the programs 379 may include a client program to allow a user to define or otherwise configure contests, as well as to monitor, manage or participate in existing contests. In addition, the programs 353 and/or 379 may provide a variety of other types of functionality in other embodiments, including to determine location information for the devices 350, as discussed in more detail in the context of an example below. While not illustrated here, the storage 351 and 371 on the devices 350 and systems 370, respectively, may store a variety of types of information, such as for storage 351 on a device to store information specific to a user of the device (e.g., user preference information, user attribute information relevant to determining whether the user is eligible to manage or participate in a contest, etc.), to contests and contest-related interactions (e.g., to linked contest promoters and bookmarked users, to communications sent to and/or received from contest promoters, etc.).

It will be appreciated that the illustrated computing systems and devices are merely illustrative and are not intended to limit the scope of the present disclosure. Computing system 300, devices 350 and/or systems 370 may be connected to other devices that are not illustrated, including through one or more networks such as the Internet, telecommunication networks or via the Web. More generally, a "client" or "server" computing system or device may comprise a combination of hardware and software that can interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated systems may in some embodiments be distributed in various components (not shown), and some functionality of the illustrated systems may not be provided and/or other additional functionality may be available.

In addition, while various items are illustrated as being stored in memory or on storage while being used, these items or portions of them may be transferred between memory and other storage devices for purposes of memory management and/or data integrity. Alternatively, in other embodiments, some or all of the software systems and/or components may execute in memory on another device and communicate with the illustrated computing system via inter-computer communication. Furthermore, in some embodiments, some or all of the systems and/or components may be implemented or provided in other manners, such as by using means (e.g., specialized electronics) that are implemented at least partially or completely in firmware and/or hardware, including, but not limited to, one or more application-specific integrated circuits (ASICs), discrete circuitry, standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components or data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The system components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
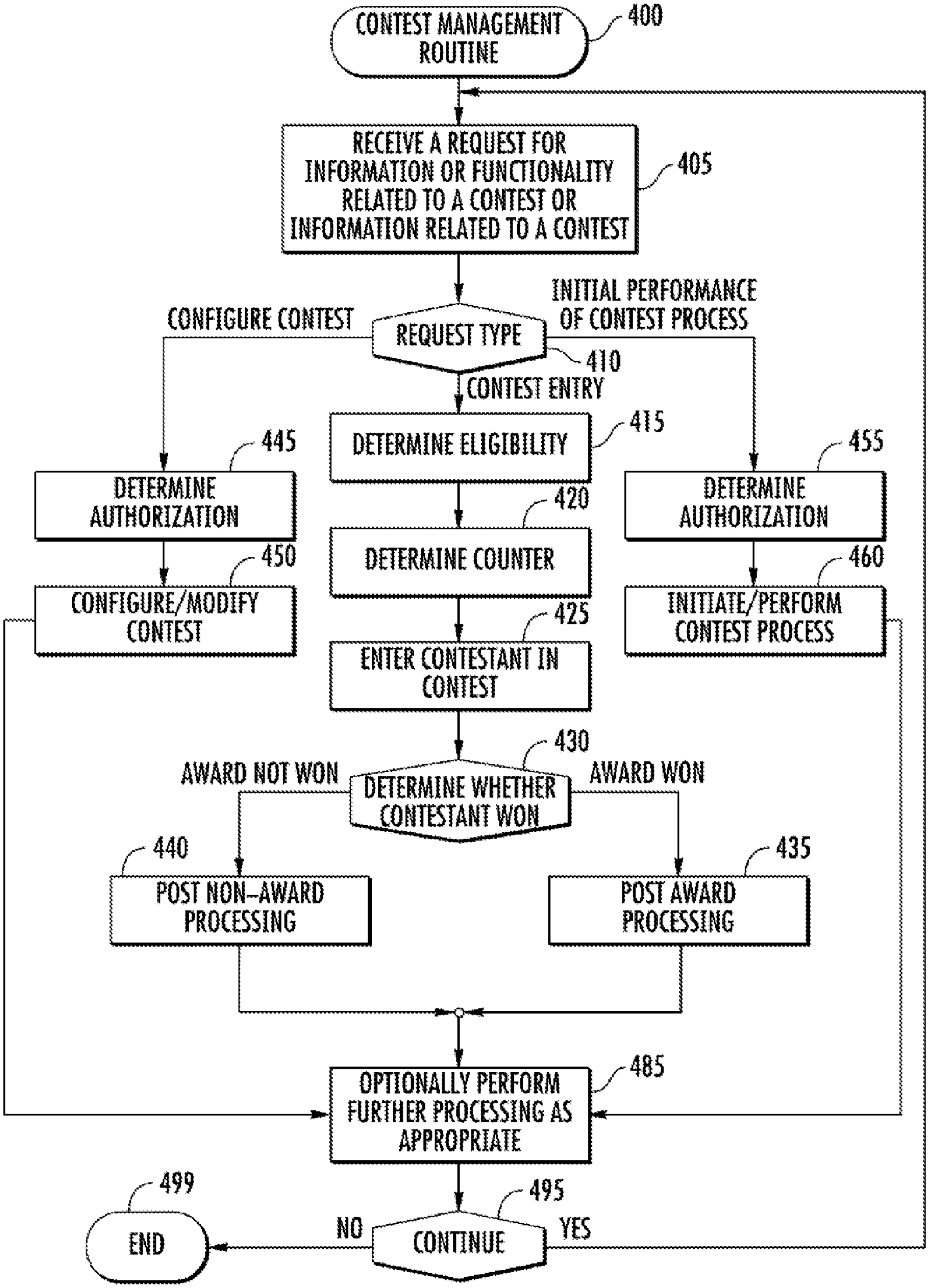
FIG. 4 is a flow diagram of an example embodiment of a Contest Management routine.

FIG. 4 is a flow diagram of an example embodiment of a Contest Management routine 400. The routine may be provided by, for example, execution of the Contest Management system 340 of FIG. 3, such as to provide contest-related information and functionality to people and computing devices in various ways.

The routine begins at step 405, where it receives a request for information or functionality related to contests (e.g., a request to setup or modify a contest, a request to manage a contest, a request from a contestant to enter a contest, a request for information related to a contest, etc.), or it receives information regarding one or more contests, users, administrators or communication-capable devices (e.g., an indication that an entry location will be closed, an indication that a user has joined a cloud, etc). The request or information may be received from an internal system of the Contest Management routine, such as an indication to perform processing, including periodic processing (e.g., based on expiration of a timer), from another system of a central server, from an external system or device (e.g., from a communication-capable device or other computing system of a contestant or an administrator, etc.).

If it is determined in step 410 that a request from a contestant to enter a contest was received in step 405, the routine continues to step 415 to automatically determine whether the contestant is eligible to enter the contest. Determining whether the contestant is eligible to enter the contest may comprise, for example, determining whether the contest is currently open and accepting entries, determining whether the contestant has previously entered the contest or one or more other contests, determining when the contestant last entered the contest or one or more other contests, determining whether or when the contestant last won a prize in the contest or one or more other contests, determining whether the contestant is using a device authorized to submit entries to the contest, determining whether the contestant is identified as an ineligible to be a contestant in the contest, determining a location of the contestant, etc. Various databases, counters, etc., may be employed in determining whether a contestant is eligible to enter a contest. When it is determined in step 415 that the contestant is eligible to enter the contest, the routine 400 continues to step 420.

In step 420, the routine automatically determines a counter to employ with the entry of the contestant in the contest. The Contest Management routine may use multiple counters, for example, to facilitate varying the odds of an entry from a contestant winning an award. For example, if multiple entries are received from a contestant within a selected period of time, it may be desired to use a different counter with the various entries from the contestant, for example as discussed in more detail herein. In some embodiments, a single counter may be employed and the step of determining a counter to employ may be omitted.

The routine continues from step 420 to step 425 to automatically enter the contestant in the contest. Entering the contestant in the contest may comprise retrieving or storing information about the contestant, the contest, etc., in a memory, such as one or more databases (e.g., databases 322, 323, 324), retrieving or determining a counter value, suspending acceptance or introducing a delay in processing of other entries in the contest, such as all other entries in the contest or all entries using the determined counter, until the current entry is processed, etc.

The routine continues from step 425 to step 430 to automatically determine whether the contestant has won an award in the contest. Determining whether the contestant has won an award in the contest may be performed, for example, by comparing a counter value of the determined counter to a reference value. For example, a counter may be configured to periodically increment, for example as discussed in more detail elsewhere herein. For example, a contestant may be determined to have won an award if a retrieved counter value in response to an entry of the user contestant has a value other than the reference value. In some embodiments, a counter value may be calculated and compared to a reference value to determine whether a user contestant has won an award.

If it is determined at step 430 that a contestant has won an award, the routine continues to step 435, where automated post-award processing occurs. Post-award processing may comprise, for example, determining a prize to be awarded, notifying the contestant or others, such as the contest promoter, etc., of the award, notifying the contestant of the process for redeeming the award and any conditions on redemption, such as time limits, redemption locations, etc., changing a value of a counter employed in connection with the entry by the contestant, such as decrementing the counter, notifying the contestant of other contests or promotions, updating databases storing user or contest information (e.g., databases 423, 424), resuming acceptance or terminating a delay in processing of other entries, etc.

If it is determined at step 430 that the contestant has not won an award, the routine continues to step 440 were automated post non-award processing occurs. Post non-award processing may comprise, for example, notifying the contestant or others, such as the contest promoter, etc., that the entry did not win an award, notifying the contestant of other contests or promotions, updating databases storing user or contest information (e.g., databases 323, 324), resuming acceptance or terminating a delay in processing of other entries, etc.

If it is determined at step 410 that a request to configure a contest (e.g., a request to setup or modify a contest) was received at step 405, the routine continues to step 445 to automatically determine whether the request is from a user or system authorized to configure the contest. Determining whether the request is from a user or system authorized to configure the contest (e.g., from an administrator user) may comprise retrieving information from one or more databases (e.g., contest information database 322, user information database 323) and evaluating the retrieved information.

If it is determined at step 445 that the request is from a user or system authorized to configure the contest, the routine continues to step 450 to automatically configure or modify the configuration of the contest as appropriate. Configuring or modifying the configuration of the contest may comprise, for example, storing or modifying stored contest definition information (e.g., start times, end times, number of prizes, redemption methods, associated businesses, probabilities to be employed, number of counters, etc.), calculating and storing contest control parameters (e.g., increment times, probabilities, etc.), storing or modifying user information (e.g., administrator user information, etc.), storing or modifying contest information (e.g., ineligible contestants, etc.), etc.

If it is determined at step 410 that a request or information related to initiating or performing a process in a defined contest (e.g., a request or indication to start the contest (such as an indication that a timer has expired), a request or indication to increment an award counter, a request or indication to determine a probability of a non-award situation, a request or indication to determine a probability of running out of awards, a request or indication to stop the contest, a request for information about the contest, etc.) was received in step 405, the routine proceeds to step 455 to automatically determine whether the request or information is from a user or system authorized to submit the request or information related to initiating or performing the process in the defined contest. Determining whether the request or information is from a user or system authorized to submit the request or information related to initiating or performing the process in the defined contest (e.g., from an administrator user, from an internal system of the Contest Management routine, etc.) may comprise retrieving information from one or more databases (e.g., contest information database 322, user information database 323) and evaluating the retrieved information.

If it is determined at step 455 that the request or information is from a user or system authorized to submit the request or information related to initiating or performing the process in the defined contest, the routine continues to step 460 to automatically initiate or perform the process. Initiating or performing the process may comprise, for example, calling subroutines, starting timers, stopping timers, incrementing award counters, decrementing award counters, storing or modifying stored contest-related information, performing periodic processing, calculating and storing contest control parameters, processing received information, providing notifications or information to users, etc.

After steps 435, 440, 450 and 460, the routine continues to step 485 to optionally perform other operations as appropriate, such as to perform periodic housekeeping operations. For example, contest information may be periodically checked, such as to determine whether an invoice for billing pertaining to the contest should be generated, etc. After step 485, the routine continues to step 495 to determine whether to continue. If so, the routine returns to step 405, and if not continues to step 499 and ends.

The contest management methods and systems described herein may be incorporated into methods and systems providing other functionality. As one non-limiting example, techniques for facilitating user interactions based on physical locations of interest, such as to provide functionality to location-based virtual groups of users, may include or be combined with techniques for managing chance-based contests.

There are many situations in which people would benefit from receiving information based on their geographic location, such as to obtain information about businesses near the geographic location and/or to interact with other people near the geographic location. This is particularly true when people are mobile, such as traveling or otherwise changing their current geographic location. One example of such information about businesses near the geographical location of a user is information pertaining to promotions offered by the business, which may include chance-based promotions.

Techniques are described below for providing location-based information and functionality to people and computing devices in various ways, such as techniques that may be combined with techniques for managing chance-based contests. In at least some embodiments, the techniques include enabling multiple people in a common geographic area to interact in various ways. For example, if each of the people is a user of one or more devices capable of communications (e.g., cellular telephones, computing devices with wired and/or wireless communications capabilities, etc.), the users may be allowed to inter-communicate via their communication-capable devices in various ways. Furthermore, in at least some embodiments, some or all such users in a particular geographic area may further be allowed to inter-communicate with one or more entities in or related to the geographic area, such as one or more businesses. In addition, in at least some embodiments, users who are remote from a particular geographic area may be allowed to inter-communicate with one or more other users or other entities (e.g., one or more businesses) in or related to that geographic area in one or more manners, or to otherwise access information and/or functionality associated with that geographic area or with such other uses or other entities, as discussed in greater detail below.

In at least some embodiments, the techniques for providing location-based information and functionality to people and computing devices include enabling the creation and maintenance of location-based virtual groups of users, such as for users of mobile and/or fixed-location devices. The location-based virtual groups, also referred to as "clouds" herein, may enable various types of interactions between group members in various embodiments, as described in greater detail below. In some embodiments, the clouds may be temporary, such as to exist for only days, hours, or minutes. Furthermore, in at least some embodiments, clouds may be mobile, such as to move with one or more people, objects, or other entities. In addition, in at least some embodiments, users in various geographical locations may be members of a particular cloud and/or may be allowed to access various functionality associated with that cloud. For example, a chance-based contest may be associated with a cloud. Additional details related to such clouds are included below. In addition, in at least some embodiments, the described techniques are automatically performed by an embodiment of a Cloud Management system, as described in greater detail below.

In at least some embodiments, the communication-capable devices of the users include networked devices capable of communicating with other networked devices, whether via wireless or wired protocols. Furthermore, in at least some such embodiments, an arbitrary set of networked device users is enabled to join a cloud in which they may interact in a specified fashion, such as based on software executing on the networked devices or hardware embedded in the networked devices, and/or via one or more central server computing systems that interact with the networked devices. In various embodiments, the networked devices communicate their locations and optionally other information (e.g., user-entered pass codes) to a central server, and the central server uses this transmitted information as well as other information (e.g., personal profile information about the users of the devices, current time, cloud configuration, etc.) to determine whether a particular user is admitted to any of the various clouds it manages. Furthermore, in at least some embodiments, a cloud is "anchored" to one or more specific point locations (e.g., one or more latitude, longitude, altitude coordinates or other designations of a geographic location) and/or one or more entities (one or more people, buildings, vehicles, business locations, etc.), referred to as the cloud's anchor(s). A user may participate in any number of clouds simultaneously in at least some embodiments, including one or more clouds for which the user's current location is inside those clouds' boundaries and/or one or more clouds for which the user's current location is outside those clouds' boundaries.

Figure 5A:
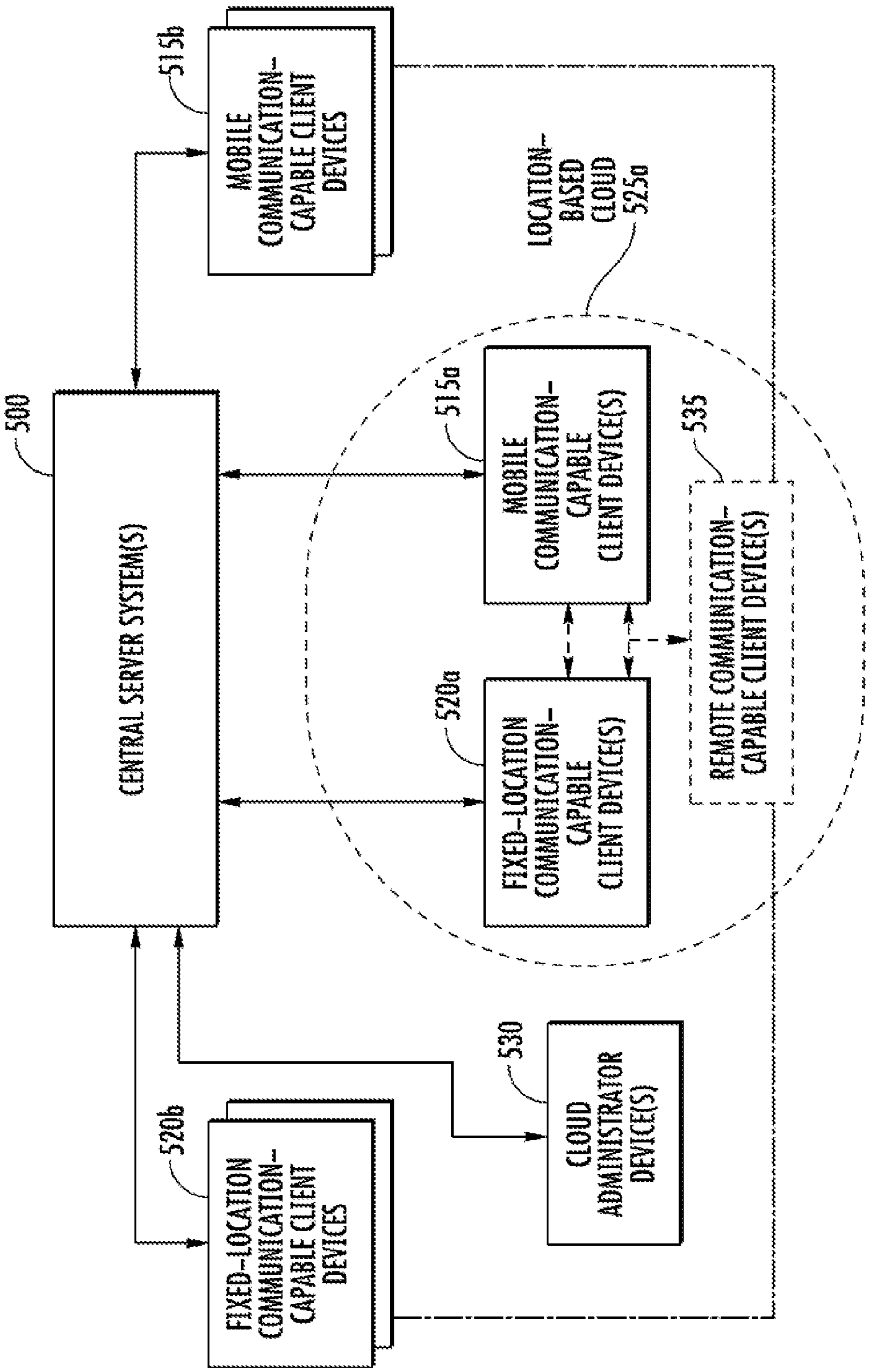
FIG. 5A is a network diagram illustrating interactions between various devices and systems located in various geographic locations.

FIG. 5A is a network diagram illustrating example interactions between various devices and systems located in various geographic locations. The illustrated example includes one or more central server systems 500 operated by an entity (not shown) to provide contest management functionality, cloud management functionality, or combinations thereof (e.g., as a business, such as for profit). In this example, various mobile communication capable client devices 515 and fixed-location communication-capable client devices 520 are able to communicate with the central server(s), as are one or more devices 530 used by cloud administrator users who may configure and manipulate clouds, by contest administrator users who may configure and manage contests associated with the cloud, etc. In this example, two or more communication-capable devices are co-located in a common geographic area, and are participating in a location-based cloud 525*a* corresponding to that geographic area on behalf of their users (not shown). The devices in the cloud may include one or more mobile communication capable client devices 515*a* and/or one or more fixed-location communication-capable client devices 520*a*. The devices of the cloud and their users may interact in various ways, including by sending communications to each other via the central server system(s) and/or directly between each other.

In addition, in at least some embodiments, the geographic area corresponding to the location-based cloud 525*a* may have other forms than is illustrated in this example (e.g., different shapes, such as to not be a regularly shaped polygon and/or regular closed curve shape, including in some situations and embodiments to have multiple non-overlapping disjunct geographic areas for a single location-based cloud). Furthermore, in at least some embodiments, one or more other additional communication-capable devices that are not physically present in the geographic area of the location-based cloud 525*a* may nonetheless optionally participate in the location-based cloud 525*a*, including to exchange information with one or more of the devices 515*a* and/or 520*a*. In this example embodiment, the additional remote communication-capable devices that are participating in the location-based cloud 525*a* each is illustrated as having a virtual presence 535 within the location-based cloud 525*a*, although the actual physical presence of those devices is elsewhere (e.g., is one or more of the devices 515*b* and/or 520*b*). As described in greater detail elsewhere, such additional remote communication-capable devices may represent various types of devices, such as for devices that were previously physically present in the geographic area of the location-based cloud 525*a* but that are no longer there, devices that have joined the location-based cloud 525*a* by checking in or otherwise joining from a remote location (e.g., optionally without ever being physically present in the geographic area of the location-based cloud 525*a*), etc.

For illustrative purposes, some embodiments are described below in which specific types of users and devices interact in specific manners as part of specific types of clouds, such as to obtain specific types of functionality coordinated by one or more cloud management systems provided by one or more central servers. These examples are provided for illustrative purposes and are simplified for the sake of brevity, and the inventive techniques can be used in a wide variety of other situations, some of which are discussed below.

In some embodiments, one person acts as a cloud administrator for a cloud. This person may, for example, establish a geographical boundary for the cloud, and may further define various configuration information for the cloud. Such configuration information may include, for example, one or more of the following: establishing optional admission criteria for the cloud to specify which users are allowed to join the cloud, such that a user physically present within the geographical boundary may be allowed to join the cloud and/or that a user that performs one or more specified actions may be allowed to join the cloud, such as actions that may include the user remotely requesting to join the cloud, the user providing a pass code established by the administrator or in another manner, etc.; establishing optional termination criteria to determine when a temporary cloud will end, such as a specific start and end date/time for the cloud, after a specified amount of time without a specified amount and/or type of cloud member activity (e.g., any user check-ins or other activity for a specified period of time), or after other specified types of cloud member activities do occur (e.g., after a specified amount of the cloud members vote to terminate the cloud, such as a majority or all members); etc. In addition, the administrator may also establish rules of interaction among users who are members of a cloud, and can dissolve the cloud manually if desired (e.g., if there is no end date/time set for the cloud or the administrator wishes to terminate the cloud before the established end date/time). An administrator may also in some embodiments transfer administrator status to or share administrator status with another user or users in the cloud or a designated agent who is not in the cloud. In the case of shared administrator status, all users designated as administrators generally have full administrative control over the cloud, except that there may be some limitations on administrator privileges for administrators other than the original administrator, e.g., a secondary administrator may not be able to disable the administrative privileges of the original administrator, may not be able to terminate the cloud without approval of the original administrator, etc.

A cloud administrator may choose to participate in the cloud or not participate, i.e., he or she could define the cloud but never actually join it. The administrator may in some embodiments and situations specify a fee that each user must pay in order to join the cloud. The fee may vary among users, depending on, for example, a user's status or location, e.g., users who are already inside a venue or the first N users to join the cloud may not have to pay to join an associated cloud; alternatively, the administrator may choose to manually apply various fee levels to specific users or groups of users. In various embodiments, the administrator(s) can monitor or otherwise view information about cloud activity, e.g., the number of users who have joined and/or exited, the number of conversations in progress, etc. both during the cloud's existence and after its termination. A record or log of all or some cloud activities (e.g., user actions) could be provided (either while the cloud is in progress or afterward or both) to some or all users who participated in a cloud.

A non-exclusive list of example forms of user interaction rules inside a cloud is as follows: (a) a user may reveal personal details to all or a subset of the other users participating in the cloud, e.g., at a professional conference, a user participating in a cloud associated with the conference may choose to reveal his professional history, his current company and position and a set of positions he is hiring for; (b) a user may only be able to view others' personal details if he reveals his own details; (c) a user may send or broadcast messages or other content consisting of text (e.g., recommendations of particular indicated businesses or other things), video, photos and other images, indications of the user's preferences or ratings (e.g., "likes" or "dislikes" of other particular content or other indicated things), or any other content transmittable over an electronic network, to other individual users or groups of users within the cloud (e.g., to all cloud members); (d) a user may block messages from any user or all users; (e) users may post messages to all users in the cloud, optionally at some administrator-specified maximum frequency; (f) users may request that another user agree to link as a "friend," which is a bidirectional mutually agreed-upon trust relationship that transcends the duration of the cloud and may provide access to information and capabilities that are not granted to other members of the cloud; (g) users may "bookmark" other users, which creates a unidirectional relationship from the first (bookmarking) user to the second (bookmarked) user, without explicit approval of the second user; (g) users may reveal their physical locations to either individuals or to all users in the cloud; the ability to see the physical location of other users may or may not require that a user reciprocally reveal his physical location; (i) users who have been invited to join a cloud but who have not yet joined may be able to communicate with participants within the cloud and/or see activity information associated with a cloud during and after the cloud's lifetime; and (j) a user may or may not be enabled to invite other users to join the cloud. In at least some embodiments, any capabilities that are available to users who have previously joined a cloud and continue to be members of the cloud are available to any such users, regardless of whether the physical location of the user is currently within the geographical boundaries of the cloud, while in other embodiments some capabilities for members of a cloud may vary such that cloud members currently within the cloud's geographical boundaries receive access to some capabilities that are not available to cloud members who are not currently within the cloud's geographical boundaries. The messages and other content that may be shared between or otherwise available to members of a cloud may have various forms in various embodiments, including to have shared content that is available to all cloud members (e.g., joint content that is an aggregation of content supplied by some or all cloud members, such as to have a virtual shared camera that includes photos posted by any of the cloud members, and optionally that satisfies one or more specified criteria, such as time-based or with respect to any other indicated attribute)—for example, a user who is a member of a cloud may in some embodiments (and optionally subject to the cloud's defined interaction rules) post content, edit content posted by others, target content to particular group members, invite other users to join the group, etc. A user who is a member of a cloud may thus access various types of cloud-specific functionality, such as content posted for the cloud, recommendations or ratings of a specified type by other members of the cloud, etc. A user who is a member of a cloud may also in some embodiments earn points for performing various activities, with such points then providing various types of benefits for the user (e.g., achieving various enhanced levels within that cloud or more generally within any clouds to which the user belongs, which have corresponding benefits), as discussed in greater detail below.

As an example of case (i), if a cloud were initiated for a party at John's home, Frank (a user who was invited to the party and given the pass code to join the cloud but who has not yet left home to go to the party) can see who is already at the party, as well as potentially other activity information (e.g., communications to some or all users in the cloud). In some embodiments, Frank may further proceed to join the party cloud before he has left his home, so as to optionally obtain access to further cloud-related functionality before physically arriving at the location of the party.

In various embodiments, a cloud itself is mobile. If the cloud's anchor (described earlier) moves, the cloud also moves. The cloud's anchor point/entity, shape and size may be specified in various manners (e.g., by the cloud administrator), and in at least some embodiments may be altered by the administrator at any time. As one illustrative example, a teacher plans to take 27 children on a walking field trip. He equips each child with a school-provided inexpensive wireless networked device (with the appropriate software or hardware) before departure. The teacher establishes a circular cloud, anchored on him, and specifies a cloud radius large enough that the children should not be more than that distance away throughout the field trip. Before departing, the teacher asks all the children to gather within the perimeter and admits them all to the cloud. As the field trip progresses, if any child leaves the boundary of the cloud, the teacher is alerted. In addition, in some embodiments and situations, multiple distinct geographical areas may each be specified to be part of a single cloud (e.g., multiple distinct stores that are part of a single company or that are otherwise affiliated, such that the geographical boundary of the cloud includes non-overlapping areas around each of the stores), thus enabling the user to be within the geographical boundaries of the cloud when the user is in any of those geographical areas.

In order to prevent frequent unnecessary alerts, various techniques may be employed to reduce "noise" at the boundary of the cloud due to users drifting in and out of the cloud, such as inadvertently (either because they are legitimately briefly exiting and re-entering the cloud or because of occasional errors in location determination on a user's device). One simple example technique to address this issue is to apply spatial and/or temporal hysteresis to the locations of some or all cloud participants with respect to the cloud boundary. In the case of temporal hysteresis, the user would need to be outside the cloud boundary for some minimum amount of time before he was identified as having exited the cloud. In the case of spatial hysteresis, the cloud participant would need to be beyond the boundary of the cloud (computed as shortest distance to the boundary) by at least a minimum distance before he would be identified as having exited the cloud.

In various embodiments, a cloud may be used for commercial purposes, in which case the administrator may pay a fee (which may be a fixed amount, a share of revenue based on activities that occur within the cloud, a function of the number of users who are targeted to join the cloud and/or who actually join the cloud, or some other function) or provide some other consideration in order to use the cloud mechanism for commercial purposes. For example, a company like ESPN may wish to create a cloud at a specific sporting event, e.g., a Seattle Seahawks game, in order to offer a real-time sports information service to users attending the game. In some commercial-use embodiments, the administrator will have the option of being the only user enabled to post messages to all users or to any subset of the users in the cloud. As another example, a museum could establish a cloud around the entire space of the facility and thus allow anyone who entered the facility to join the cloud. Participants in the cloud would then receive location-sensitive guidance and information about works of art, e.g., when a user is standing in front of a specific painting, his networked device would receive information about that painting. While in some situations a particular company or other entity may operate a Cloud Management system embodiment to manage one or more clouds for itself (e.g., corresponding to one or more retail outlets or locations of the company), in other embodiments an operator of a Cloud Management system embodiment manages clouds corresponding to various other companies or other entities, such as other companies or entities that are affiliated in some manner with the Cloud Management system operator (e.g., a company who pays a fee to the system operator for managing corresponding cloud functionality at one or more retail locations of the company) or instead that are unaffiliated with the Cloud Management system operator (e.g., a company who is unaware of or otherwise unaffiliated with a cloud provided at one or more retail locations of the company). When a cloud is associated with one or more locations of a particular company or other entity, various additional functionality may be provided to users who are members of the cloud, including the following non-exclusive list: to enable commercial offers to be provided to some or all cloud members (e.g., to members that opt in), such as offers from the associated company or other entity for the cloud, or instead from a third-party operator of the Cloud Management system (whether offers originated from the Cloud Management system operator, or offers that are originated by other companies and entities and provided to cloud members by the Cloud Management system operator); to enable points to be provided to cloud members based on interactions with the company (e.g., purchases made from the company), with the points being issued by the Cloud Management system operator and/or by the associated company for the cloud; etc. In situations in which a company or other entity makes an offer to cloud members, whether or not the cloud is associated with that company or other entity, the company or other entity may in some embodiments pay a fee to the Cloud Management system operator corresponding to the offer, such as one or more of a flat fee for making the offer, a fee for making the offer that varies with the number of cloud members to which the offer is made and/or in accordance with one or more other attributes of those cloud members, a fee based on the offers that are accepted by cloud members, etc. An offer may be or include an offer to participate in a chance-based contest, such as a chance-based contest associated with the cloud, or with a merchant participating in the cloud.

In yet another example, a cloud may be established within the physical boundaries of a restaurant, bar or similar establishment (whether by that company or by a third-party Cloud Management system operator) and allow customers who join the cloud to place orders for food, drinks, etc. or make other requests of the establishment's staff. The ordering customer's message and his location are transmitted from the mobile device to a server and then to a client device (either another mobile device, a PC or other networked device) managed by the establishment. The human server then responds to the request (which could include sending messages to the user's mobile device) and uses the location information accompanying the request message to determine the appropriate customer to service. Furthermore, if a user who is a member of the cloud is not physically located within the cloud boundaries, the user may still in some embodiments and situations be able to place such orders for food, drinks or other items, such as for delivery to another person who is physically located within the cloud boundaries (e.g., to enable a remote purchase of a drink for one or more friends or other people at the location, such as for other cloud members). Similarly, certain establishments, e.g., coffee shops, could allow customers who are cloud members to place their order from a remote location or to pre-specify their order (such that when the customer arrives within the cloud boundary, the order is placed), so that the food/drink/etc. preparation process can begin before the customer arrives at the point-of-sale location. This provides for ordering that (a) is extremely likely to be consummated with payment by the customer, if payment is not already made at the time of order placement, and (b) allows for appropriate preparation timing (e.g., for a hot drink). As another example, a pizza delivery establishment with multiple delivery outlets could create a cloud encompassing their delivery area. Users within the delivery area could order pizza from a mobile device and the pizza delivery company would route the order to the nearest delivery outlet for processing, with orders from outside the delivery area optionally not being allowed.

In various embodiments and situations, there is no cloud administrator for a particular cloud. In this case, a set of default rules, specified by a central server of the Cloud Management system or by the device user or a combination of the two, will apply to the user interactions in the cloud. This type of cloud is known as an "ad hoc cloud" and is established when two or more networked location-aware devices come within a pre-defined range (specified by the device users or centrally) of each other and are configured to participate in ad hoc clouds. The configuration can be controlled by the device user such that (a) he can specify whether he must approve the joining of an ad hoc cloud; (b) only ad hoc clouds meeting certain criteria are surfaced to the user, e.g., based on the personal characteristics of the second device owner (e.g., gender, single/married, is the other person already linked as a friend, physical characteristics such as age, height, weight, etc., general location of residence, job type, religious beliefs, etc.); (c) he can specify the maximum number of people allowed in an ad hoc cloud in which he is participating (which will both stop others from joining a cloud for which he is already a member and the maximum number of participants has been reached, and stop him from joining another cloud if that cloud already has greater than or equal to the maximum number of cloud users he has specified). Such configuration information is sent from the client device to a central server of the Cloud Management system. In various embodiments, the central server detects when users are in appropriate proximity (based on configuration) to join an ad hoc cloud and determines whether the criteria established by the potential cloud co-participants match the profile information of the other user(s). In the case of a cloud between exactly two people, both users' profiles must match the other user's criteria for either user to be presented an opportunity to join the cloud. In the case of an ad hoc cloud among more than two users, a variety of techniques may be employed to determine whether a user is presented with an opportunity to join the cloud. One such algorithm is that each user's profile must match at least N other user's criteria in order to be presented the opportunity to join the cloud, where N is greater than or equal to 1. Another example is to allow current cloud participants to vote, and only if a sufficient number (which could be a majority, two-thirds or some other fraction of votes) acquiesce (e.g., vote "yes") is the new user presented with the opportunity to join the cloud. Such voting by cloud members (also referred to as "participants") may also be used in at least some embodiments with clouds configured by one or more administrators and/or for purposes other than admitting new users to the cloud, such as if allowed by the administrator and/or in some situations to take certain types of actions without explicit administrator approval (e.g., to terminate an existing cloud).

In various embodiments, a cloud may create a residual permission group that survives the cloud's termination. Such a permission group would allow users in the cloud to, for example, communicate online with other users from the cloud even after the cloud was terminated, either through a proxy (e.g., a website that does not reveal users' email addresses, a central server, etc.), directly by email, or via some other means. In such embodiments, users may be empowered to opt out of the residual permission group, in which case they may be unable to interact with others in the permission group.

In various embodiments, search functionality is provided to users via their networked devices, such as to discover existing clouds (e.g., to help a user determine whether there are any clouds he would be interested in joining) and/or to identify other information of interest. Such search functionality may be able to filter the search results based on various criteria, including those clouds the searching user could potentially participate in. As examples, "show only those clouds that are nearby and configured as visible" (by the cloud administrator or another method of cloud configuration) or "show only those clouds that are 'open' to arbitrary users or that have entrance admission criteria that the searching user matches." In some cases, a searching user may be allowed to see activity in a cloud before joining and even interact with participants (e.g., in a more limited fashion than if the searching user became a cloud participant), depending on the cloud configuration. In various embodiments, the user will receive a proactive notification on his mobile device when he is in the proximity of clouds that he is able to join. Such notification could be accompanied with information about the cloud, its participants, previous activity, and so on, and direct him to the nearest physical location in which he would be within the boundary of the cloud or otherwise direct him to perform particular activities to enable joining the cloud.

With regard to implementation, the general case in at least some embodiments consists of at least three components: a server component, a client component, a networked device, e.g., a PC (but which could be one and the same with the client component) and a database component. The client is generally a mobile device that communicates via wireless signals over a wireless network with the server in such embodiments. The server (which, for scaling purposes, can be implemented as many physical servers) also sends information to the client in such embodiments, e.g., when the client is admitted to or exits a cloud, the server notifies the client as such and the client takes appropriate actions. The networked device, which might be the client, but which might be a separate device and is not necessarily mobile, is used to define and configure the cloud on the server in such embodiments. The database component in such embodiments is used by the server to store cloud definition and configuration data, cloud activity and participation data and other information associated with clouds.

A client device is in at least some embodiments capable of determining its location via global positioning system (GPS) signals or other location technologies, and if so the location information may be transmitted frequently to the server. Some or all information entered by the user into the client device, e.g., pass codes, messages to other users in a cloud, user profile updates, etc., is also transmitted to the server.

The networked device in such embodiments is used to define and configure a cloud. It can also be a client, but is often separate, e.g., the client might be a cellular phone while the networked device is a home PC. The networked device communicates via network signals (either wireless or wired) with the server, and the user interface presented to the user is guided in large part by the instructions received from the server. Information entered by the user (e.g., the definition of a cloud) is transmitted to the server and responses (e.g., status of a cloud) are sent from the server to the networked device.

The software running on the server in such embodiments acts as a controller for the user interface on both the networked device and the client. Information received by the server from these two components (e.g., user-entered cloud definitions or pass codes) is stored in the database component along with information generated by the server (e.g., status changes in a cloud when access to join a cloud is granted by the server to a user). Because the server receives information from the users, it maintains a central model (which is back-stored in the database component) of the state of the clouds and enforces the rules associated with a cloud.

The database component in such embodiments is used as an information store for the server. Cloud definitions (physical geometry and location information defining a cloud), rules associated with a cloud (e.g., whether a pass code is required for access, whether the cloud has an administrator or not, the attributes of or other admission criteria for users allowed to join a cloud, maximum users allowed in a cloud, etc.) user activity (e.g., messages sent between users within a cloud, enter/exit events, etc.) permissions, access decisions, user location information over time and so on which either flow to the server from the client and/or networked device or which are generated by software running on the server can be stored for later retrieval in the database component. The database component, like the server component, might be implemented as multiple physical database instances for scaling reasons.

Figure 6A:
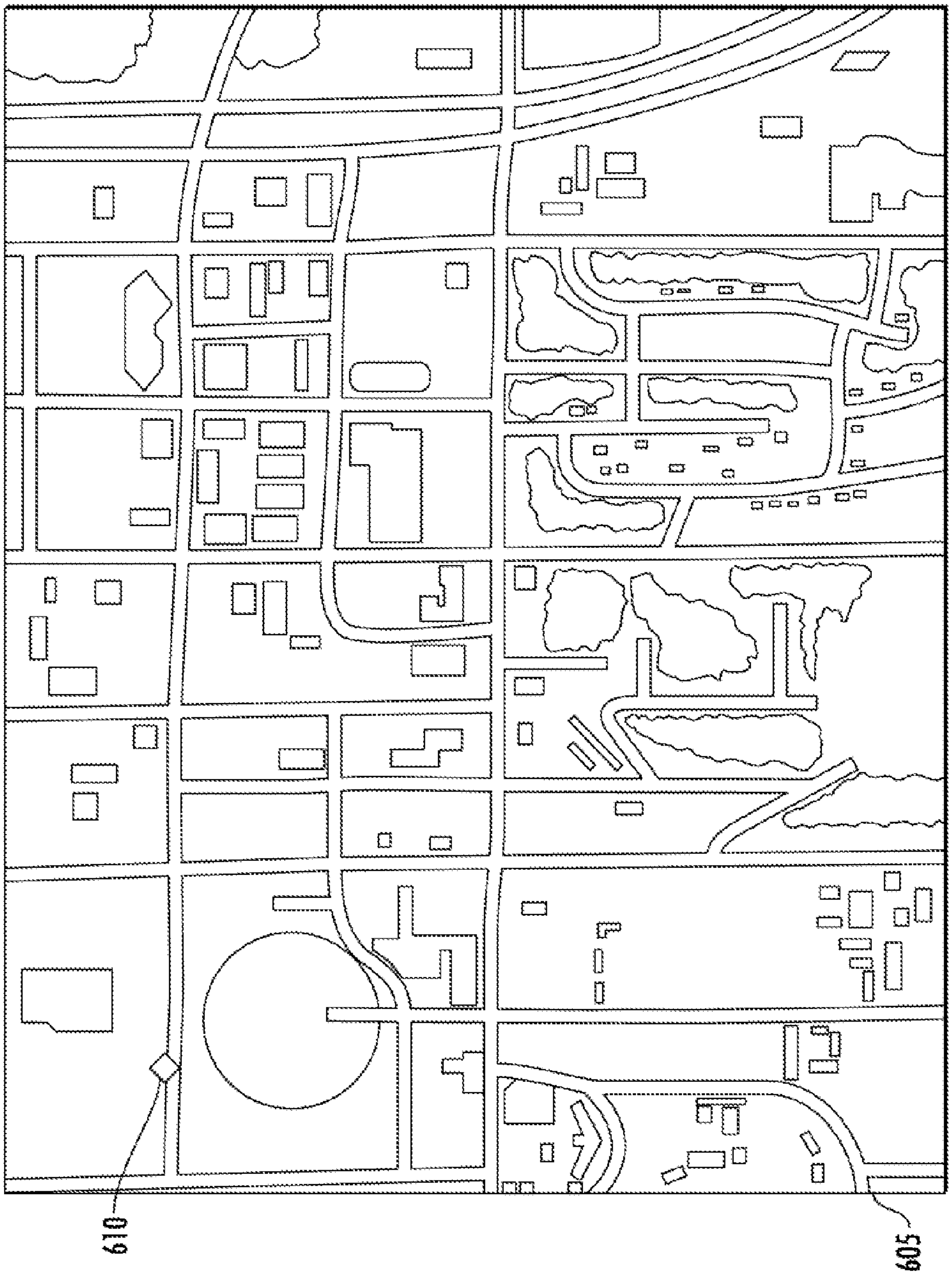
FIGS. 6A-6C illustrate examples of providing location-based information and functionality to various geographical locations indicated on maps.
Figure 6B:
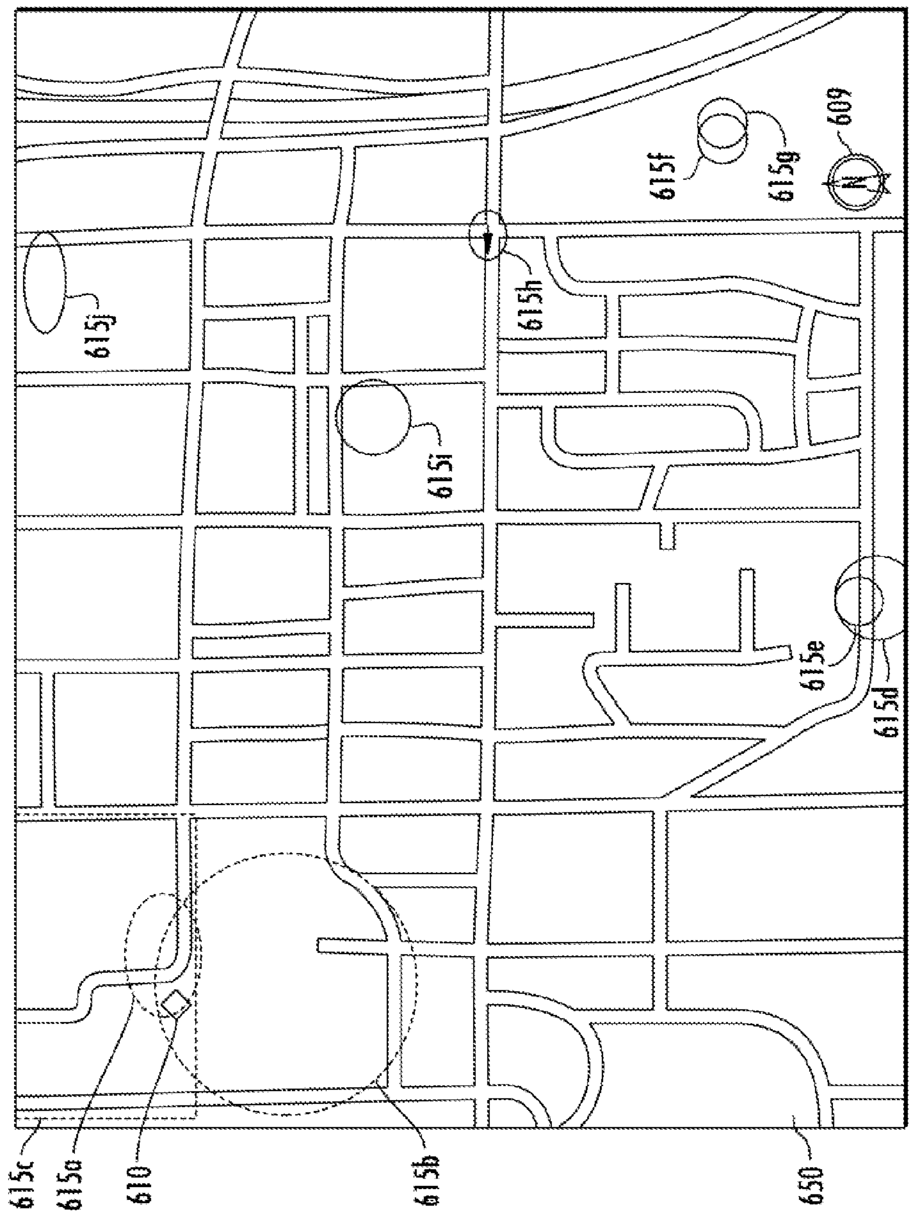
Figure 6C:
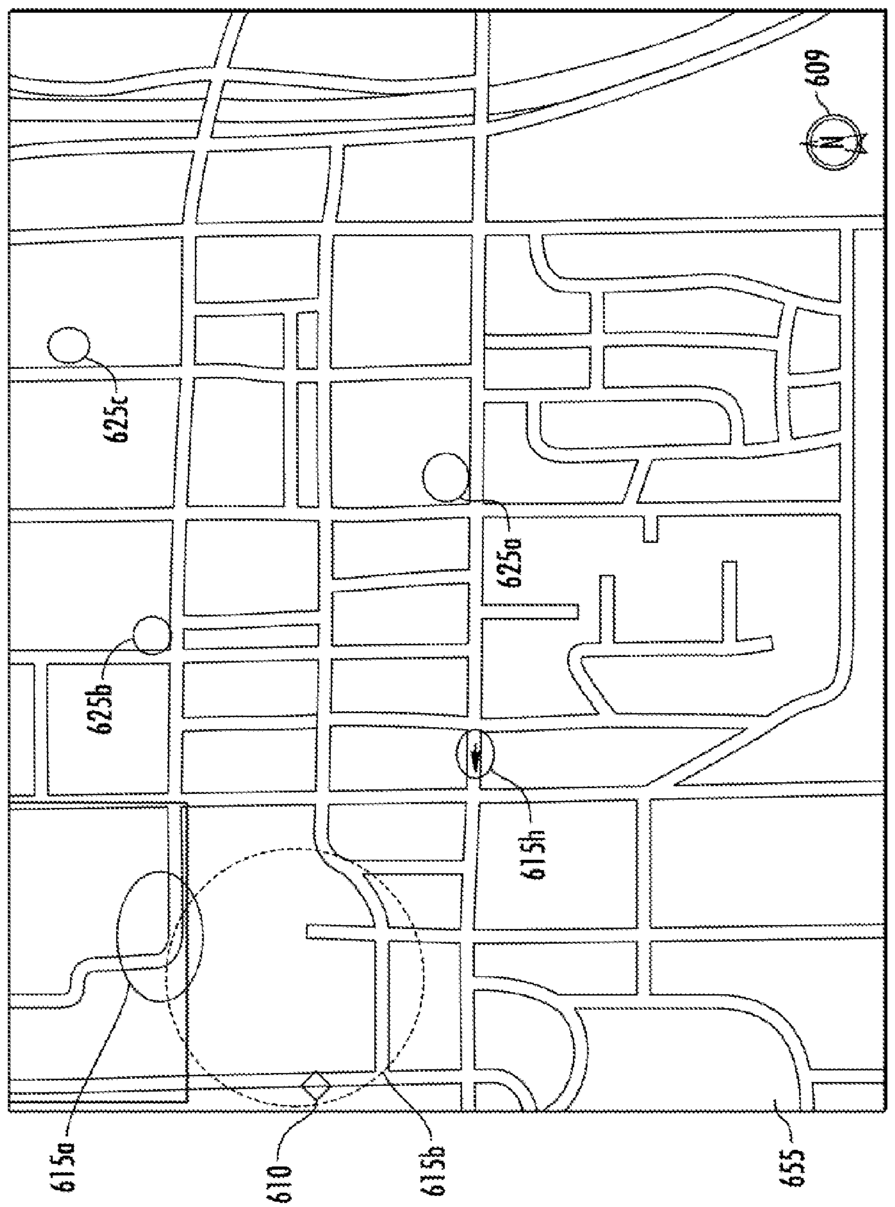

FIGS. 6A-6C illustrate examples of providing location-based information and functionality to various geographical locations indicated on maps. In particular, FIG. 6A illustrates a map 605 that shows image data (e.g., a satellite image or other photo) with road annotations for a geographical area corresponding to a section of the city of Bellevue, Wash. A particular user has a current geographical location 610 that is shown on the map with a black triangle. The illustrated map may be provided to, for example, the user for display, such as by a central server as part of a graphical user interface to provide access to cloud-related functionality. In this example, information about existing clouds in the geographical area of the map is not displayed to the user, but in other embodiments such information may be displayed.

For example, FIG. 6B illustrates an alternative map 650 for the same geographical area, but with information about various existing clouds 615 being displayed on the map. This map 650 may be provided to and/or displayed to the user in response to, for example, a request from the user for information about some or all clouds in the geographical area, or as part of a notification that is pushed to a device of the user without an explicit corresponding request. In this example, the map 650 includes road information but not image data, although in other embodiments the information about the clouds 615 may instead be displayed in other manners (e.g., as part of an image data map such as that displayed in FIG. 6A). In this example, the displayed clouds are of a variety of types, and in other embodiments a variety of other types of clouds may be displayed. For example, clouds 615*d* and 615*e* correspond to parts of Bellevue High School, such as the smaller cloud 615*e* corresponding to a particular location within the school grounds (e.g., a particular classroom, student or staff gathering area, etc.), and the larger cloud 615*d* corresponding to the entire school. Clouds 615*f* and 615*g* are overlapping clouds corresponding to portions of a hotel, such as to correspond to one or more of the hotel lobby, pool area, a particular floor (e.g., based on a group staying together on the floor), restaurant, etc. A cloud 615*i* in this example corresponds to a retail store, in this case a Toys 'R' Us store. A cloud 615*j* corresponds to the Bellevue Convention Center, such as a temporary cloud that corresponds to a particular current convention in progress. In addition, a cloud 615*h* has been established to correspond to a moving vehicle, such as a bus. In this example, a direction legend 609 is also illustrated.

In this example, the user at the location 610 is eligible to participate in 3 clouds that encompass that location based on that location (although may not be eligible for one or more of those clouds based on other admission criteria for the clouds), and may also optionally be eligible to participate in one or other clouds at other locations. In this example, a cloud 615*b* is centered around a park, such as to correspond to a temporary festival or other event occurring in the park. In addition, a nearby mall has multiple clouds that encompass the location 610, including a cloud 615*c* corresponding to the entire mall, and a cloud 615*a* corresponding to a particular store in the mall. In this example, the three available clouds whose geographic boundaries include the current location of the user are illustrated using dashed lines, such as to provide information to the user regarding at least some of the clouds that the user may join (e.g., by selecting the displayed representation of the cloud on the map), although in other embodiments some or all of the clouds may be displayed in other manners. For example, if the user requests to join a specified new cloud or to check-in to a specified cloud for which the user is already a member (e.g., by selecting a graphical indication of the cloud on the map, by selecting a hyperlink or other user-selectable option in a list or other textual format that corresponds to that cloud, etc.), the device may proceed to perform that request. Alternatively, if the user requests to join a new cloud or to check-in to a cloud for which the user is already a member, but without specifying a particular cloud with the request, the Cloud Management system may display or otherwise provide to the user a list of one or more possible clouds that are available, with the list optionally being ordered based on one or more criteria (e.g., distance between the user's current location and the geographical boundary of a cloud, such as to list clouds 615*a*, 615*b* and 615*c* before any other clouds; likelihood that the user is currently within a cloud; clouds for which the user is already a member, if the request is to check-in to a cloud or to a business associated with a cloud; clouds for which the user is not already a member, if the request is to join a new cloud for which the user is not already a member; etc.). When generating an order for such possible clouds, various other information may similarly be considered in at least some such embodiments, such as the user's preferences, historical activities (e.g., to rank the cloud 615*a* first if the user regularly shops at the store associated with that cloud), etc.

FIG. 6C illustrates a map 655 similar to the map 650 of FIG. 6B, but it corresponds to a time shortly after the time represented in FIG. 6B. In particular, the user has moved to a new location 610 in which the geographical boundaries of cloud 615*b* continues to enclose the new location of the user, but in which the geographic boundaries of clouds 615*a* and 615*c* no longer enclose the new user location. Similarly, the moving vehicle has traveled during the time interval, as has its corresponding cloud 615*h*. Other previously displayed clouds are not displayed here, such as based on user-specified modifications to the display (e.g., to show only clouds that exist within a specified distance from the user's location, such as a distance corresponding to approximately 6 blocks). In addition, an additional location-based cloud 625 is illustrated in this example, which has three non-overlapping geographic areas 625*a*, 625*b* and 625*c* that are part of the cloud—in particular, in this example, each of the geographic areas 625*a*, 625*b* and 625*c* corresponds to a different retail outlet of a single coffee company (e.g., different coffee shops operated by the same retailer) that is a distinct anchor of the cloud 625. In other embodiments, the geographic boundaries of such a cloud 625 may have other shapes, such as to have a single closed shape that encompasses all of the geographic areas 625*a*, 625*b* and 625*c*. In this example, the user at location 610 is able to remotely check in to one of the three coffee shops corresponding to the geographic areas 625*a*, 625*b* and 625*c* if so desired while the user is still at location 610, such as to obtain information corresponding to cloud 625 (e.g., to see cloud members who are currently at any of the three coffee shops or alternatively at the one coffee shop to which the user checks in, to obtain information about any current offers available to cloud members from the coffee company or other companies or entities, to post content or obtain available content for the cloud, etc.), to provide information to other cloud members (e.g., to notify other cloud members that the user is planning on arriving at the checked in coffee shop at a specified time in the future, and optionally to invite other users to join him/her), and/or to access functionality associated with the cloud (e.g., to place an order to be ready at a future time when the user plans to arrive at the checked-in coffee store, to place a current order for another cloud member who is currently at one of the coffee stores, etc.). In some embodiments, the ability for the user to check-in at the coffee shop (or more generally to check-in to the cloud 625) is only available to users who are already cloud members, while in other embodiments the user may request to join the cloud 625 for the first time from the remote location 610. Alternatively, the user may instead first travel to one of the coffee shops and then check-in to that coffee shop or to the cloud 625 while at that location, whether explicitly or based on a mobile device of the user being able to determine that location (e.g., based on GPS or other location-determination capabilities of the device, based on the user using the device as part of a transaction, etc.). Joining or checking in to a cloud, such as a location-based cloud, may be a redemption condition for an award received in a chance-based contest.

In some embodiments, a particular location-based cloud may have one or more associated anchors, but may be associated at least in part with common activities that occur at those anchor locations or other common attributes of those anchor locations, referred to generally herein as a society-based cloud. For example, a particular society-based cloud may be associated with users who meet at various locations as part of a book club, who like to eat food of a particular ethnicity, who are part of the same club or other group, etc. As one example, a particular book club may meet occasionally at the coffee shop at location 625*b*, at the Bellevue Downtown Park corresponding to location 615*b*, and optionally at one or more other locations that are not illustrated in FIG. 6C—for such a society-based cloud, locations 615*b* and 625*b* (but not 625*a* or 625*c*) may be anchors of a corresponding location-based cloud that may have some or all of the same types of associated features and functionality as described elsewhere herein for other clouds. Furthermore, such society-based clouds may be formed and modified in various manners, including based on actions of users who are members of the clouds. As with other clouds, in some embodiments a society-based cloud has one or more administrator users who define various information about the society-based cloud, including to specify one or more locations associated with the society-based cloud. In addition, in some embodiments, one or more users who are members of a society-based cloud may modify the cloud in various manners, such as by requesting that a new location be added to the cloud (e.g., to request that the Bellevue Square Mall at location 615*c* be added to the cloud if the users have been to meet occasionally in a public gathering area of the mall), by indicating cloud-related activities occurring at a particular location (e.g., if multiple people check-in to the book club cloud while at the coffee shop corresponding to location 625*a*, to infer that the new location is another anchor of the society-based cloud), etc. Users may indicate such cloud-related activities in various manners, such as in some situations by adding a tag corresponding to a particular society-based cloud to a particular new location—similarly, in some embodiments an ad-hoc society-based cloud may be automatically created by multiple different users using a common tag at a given location, optionally at the same time. Furthermore, in some embodiments, such society-based clouds may have associated times associated with particular anchors for the cloud (or for the cloud generally), such as if the book club cloud is associated with coffee shop location 625*b* only on Wednesdays from 10 am-noon, if the book club cloud is associated with Bellevue Downtown Park location 615*b* only during the summer months, etc. In a similar manner, a "night owls" society-based cloud may have an associated time of 10 pm-2 am, optionally with one or more associated locations such as bars and/or late-night diners.

It will be appreciated that the details of FIGS. 6A-6C are provided for illustrative purposes, and are not intended to limit the scope of the invention.

Figure 5B:
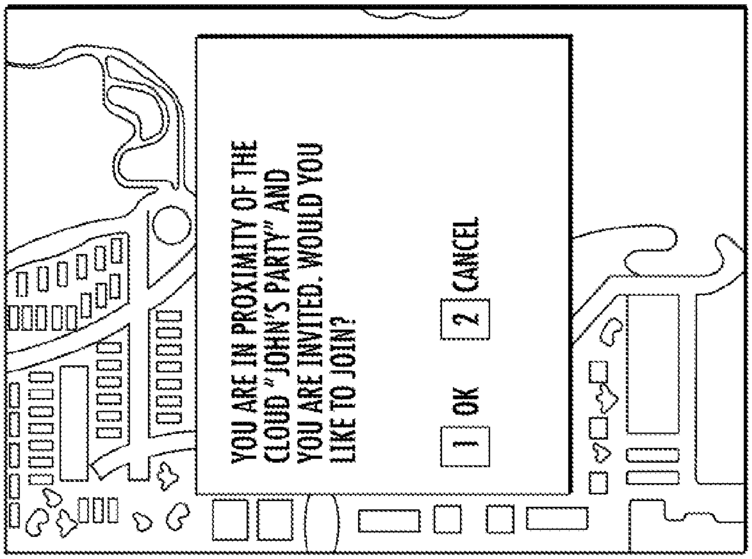
FIGS. 5B-5F illustrate examples of providing location-based information and functionality to a user via an example graphical user interface displayed on a mobile device of the user.

FIGS. 5B-5F depict the screen of a mobile device showing an example cloud user interface that demonstrates user interaction in certain embodiments. In FIG. 5B, a user is notified that his physical location is within the physical boundary of the cloud entitled "John's Party," such as based on the user moving into the cloud geographical area. The mobile device previously sent the user's location to the server, and the server determined the location was within the polygon associated with the cloud "John's Party." It also determined that the user is authorized to join this cloud. In this example, the user selects the "OK" option in FIG. 5B by pressing the 1 key on his mobile device, which moves the user to FIG. 5C. The displayed screen may be, for example, part of a Web page supplied by a server associated with a Cloud Management system, with the "OK" option having an associated hyperlink or other similar control to cause corresponding information to be sent back to the server.

Figure 5C:
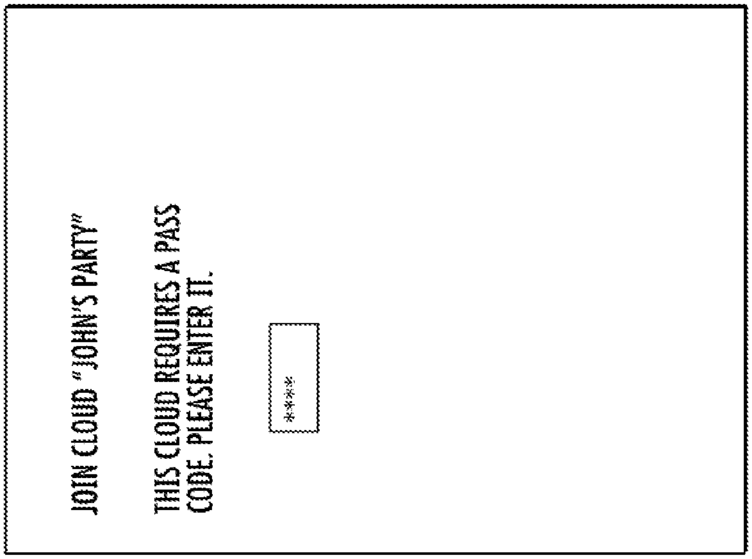
Figure 5D:
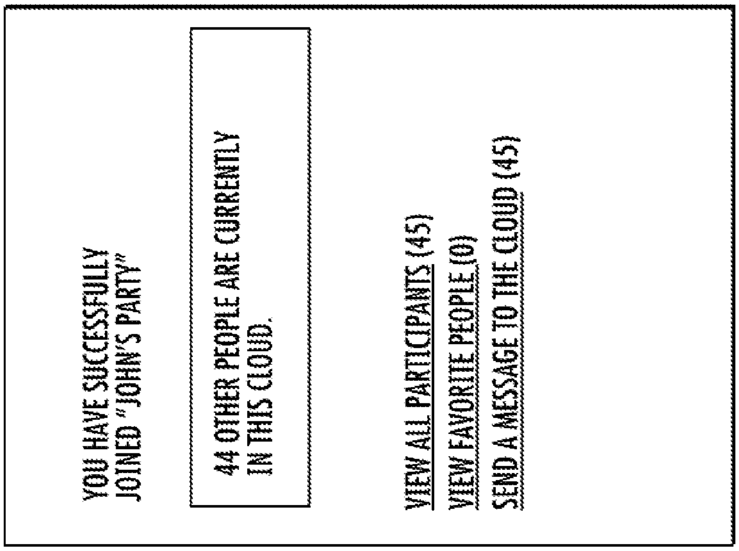

FIG. 5C exemplifies a cloud configured to require a pass code. After the user enters the pass code, the user interface of FIG. 5D is displayed or otherwise presented to the user. In this example, the user has joined the cloud and sees via the user interface illustrated in FIG. 5D that there are 44 other people already participating in the cloud. The user is offered a few options, including viewing all the cloud participants, viewing people he has saved to his "Favorite People" list (which has zero people in it, since this user just joined the cloud) and sending a message to all cloud participants (which is a capability that may or may not be present in a cloud, depending on the cloud configuration and the current state of the cloud, as described earlier). The user chooses the option "View all participants" and moves to FIG. 5E.

Figure 5E:
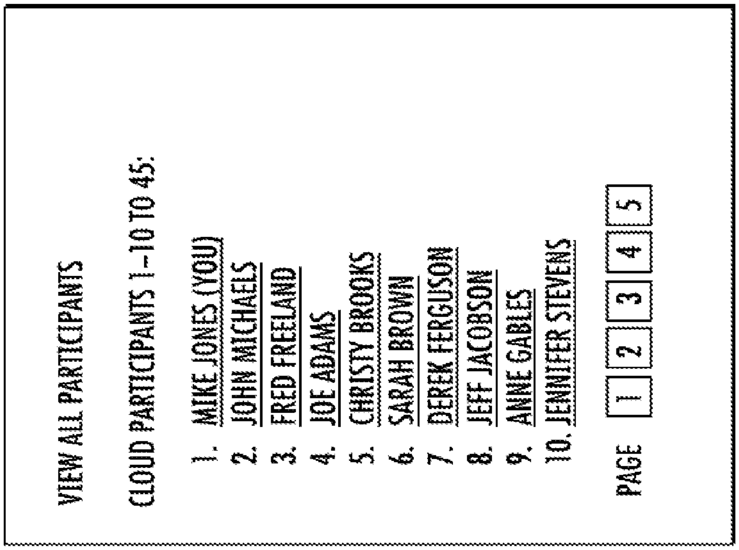

In FIG. 5E, the user is presented with a list of 10 cloud participants out of 45 total (44 other users plus this user). The user can choose to see additional users by choosing a page number at the bottom of the list or may choose one of the users from the list. In this example, the user chooses "Jennifer Stevens" which takes him to FIG. 5F.

Figure 5F:

In FIG. 5F, the user is presented with information that the cloud participant Jennifer Stevens has indicated she is willing to reveal to other cloud participants. The user is presented with four options for interacting with Jennifer, including sending her a message, adding her to his Favorite People list, inviting her to be his friend (which Jennifer must accept in order for the formal relationship to be effected) or revealing his location to Jennifer. In the latter case, Jennifer would receive a message indicating that this user has revealed his location. In various embodiments, Jennifer would be able to view his location on a map so she could find him within the confines of the cloud.

Figure 7:
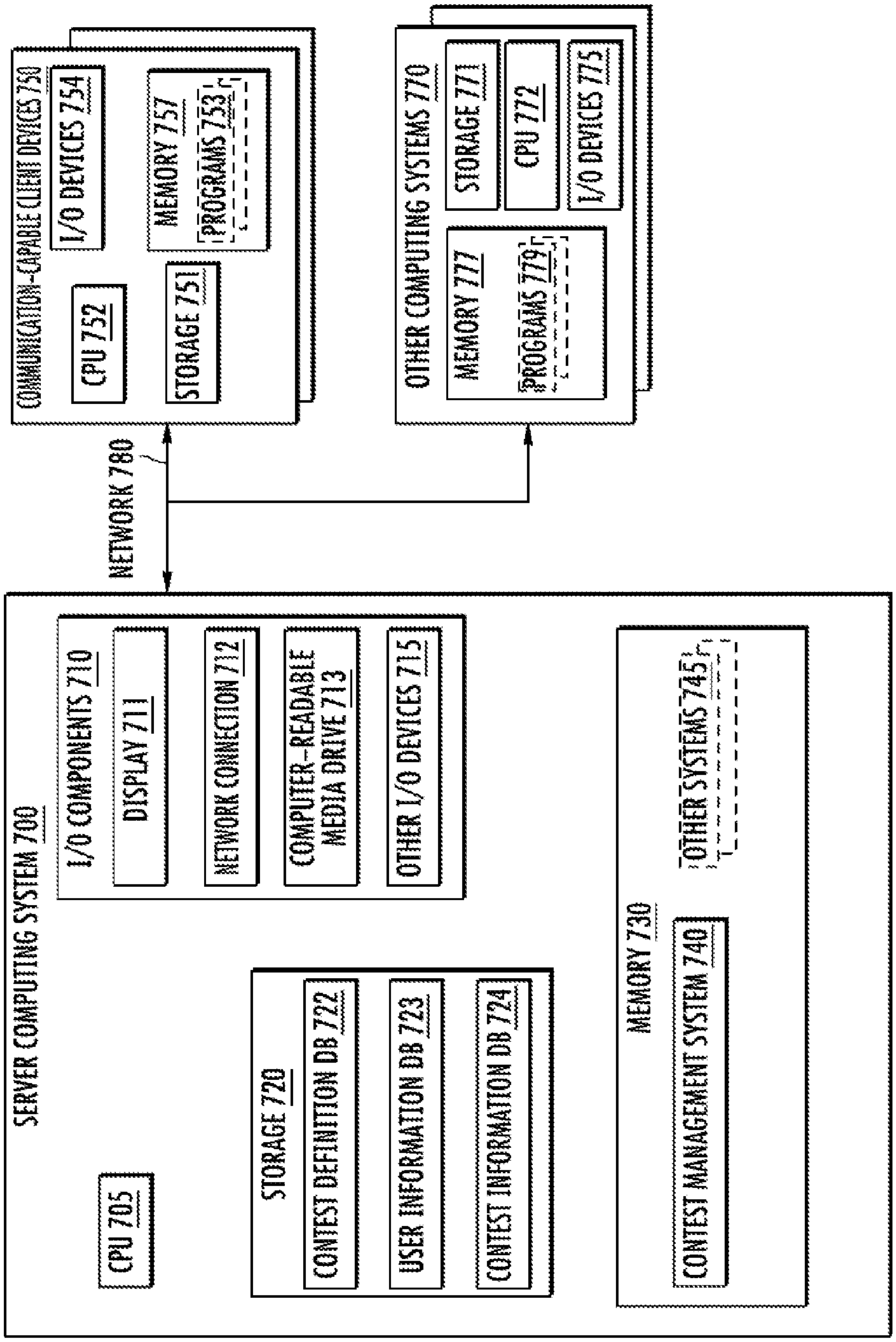
FIG. 7 is a block diagram illustrating a computing system suitable for executing an embodiment of a Cloud Management system, which may include an embodiment of the described Contest Management system.

FIG. 7 is a block diagram illustrating an embodiment of a server computing system 700 that is suitable for performing at least some of the described techniques, such as by acting as a central server to manage the creation and operation of clouds. The computing system 700 includes one or more central processing units ("CPU") processors 705, various input/output ("I/O") components 710, storage 720, and memory 730, with the illustrated I/O components including a display 711, a network connection 712, a computer-readable media drive 713, and other I/O devices 715 (e.g., keyboards, mice or other pointing devices, microphones, speakers, etc.).

In the illustrated embodiment, an embodiment of a Cloud Management system 740 executes in memory 730 in order to perform at least some of the described techniques, such as to provide location-based information and functionality to people and computing devices in various ways. The Cloud Management system in the illustrated embodiment includes software instructions that when executed by one or more of the processors configure the server computing system 700 to perform the described techniques. In particular, cloud administrator users may interact with the Cloud Management system in order to define configuration information for clouds and manage the clouds, such as via communication-capable client devices 750 and/or other computing systems 770. In addition, various communication-capable client devices 750 may interact with the Cloud Management system, such as to provide location information for the devices and/or information about users of the devices, so that the Cloud Management system can determine clouds that are available to the devices and their users, and otherwise manage clouds in the manners described elsewhere herein. In this example embodiment, cloud definition information, user information, and information about clouds (e.g., their membership, historical cloud interaction information, etc.) are stored in databases ("DBs") 722-724 respectively on storage 720, although such information may be stored in other manners in other embodiments. The other computing systems 770 may also perform other actions in some embodiments, such as to be operated by companies or entities (e.g., to manage clouds associated with their geographical locations, to make offers to members of particular clouds, etc.).

One or more other systems 745 may also be optionally executing in memory 730 in this example, such as a payment processing system to handle fees and other payments for the Cloud Management system, a search engine to provide search capabilities to users of devices 750 other than to indicate cloud-related information, a system to analyze and generate various cloud-related information (e.g., to determine patterns corresponding to users and related clouds, such as to determine that users who are members of a first cloud are also frequently members of a second cloud, or that users who are members of the first cloud frequently visit a particular location that is not part of the first cloud), a system to identify various types of events of interest for clouds and to send corresponding notifications to members of those clouds and/or to other users (e.g., to send notifications to members of a cloud when a new offer, such as an offer to enter a chance-based contest, is made for the cloud; to send notifications to members of a cloud when a new member joins the cloud; to send notifications to members of a cloud when a specified type of activity happens for the cloud, such as a "trending event" involving several members checking in at a particular location within the cloud; to send notifications to members of a cloud when a new recommendation or rating is entered by a cloud member; to send notifications to members of a cloud when a member's current physical location nears a specified location of interest for the cloud; to send notifications to members of a cloud when a pattern of interest is determined for the cloud; etc.), a system to manage points and associated benefits to be provided to users based on particular cloud-related activities that they perform, a system to manage chance-based contests associated with one or more clouds, such as the Contest Management system 340 discussed with respect to FIG. 3, etc. The devices 750 and systems 770 may each have one or more programs 753 and 779, respectively, executing in memory 757 and 777, respectively, to provide various functionality. For example, the programs 753 may include a Web browser or other client program (e.g., a client program specific to the Cloud Management system) that a user may use to interact with the Cloud Management system, such as a program that provides a graphical user interface to users in other to provide various functionality related to participation in clouds. Similarly, the programs 779 may include a client program to allow a user to define or otherwise configure clouds, as well as to monitor and manage existing clouds. In addition, the programs 753 and/or 779 may provide a variety of other types of functionality in other embodiments, including to determine location information for the devices 750. While not illustrated here, the storage 751 and 771 on the devices 750 and systems 770, respectively, may store a variety of types of information, such as for storage 751 on a device to store information specific to a user of the device (e.g., user preference information, user attribute information relevant to determining whether the user is eligible to be admitted to clouds, etc.), to clouds and cloud-related interactions (e.g., to linked friends and bookmarked users, to communications sent to and/or received from other cloud members, etc.).

It will be appreciated that the illustrated computing systems and devices are merely illustrative and are not intended to limit the scope of the present disclosure. Computing system 700 and/or devices 750 may be connected to other devices that are not illustrated, including through one or more networks such as the Internet or via the Web. More generally, a "client" or "server" computing system or device may comprise a combination of hardware and software that can interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the illustrated systems may in some embodiments be distributed in various components (not shown), and some functionality of the illustrated systems may not be provided and/or other additional functionality may be available.

In addition, while various items are illustrated as being stored in memory or on storage while being used, these items or portions of them may be transferred between memory and other storage devices for purposes of memory management and/or data integrity. Alternatively, in other embodiments, some or all of the software systems and/or components may execute in memory on another device and communicate with the illustrated computing system via inter-computer communication. Furthermore, in some embodiments, some or all of the systems and/or components may be implemented or provided in other manners, such as by using means (e.g., specialized electronics) that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components or data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The system components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 8:
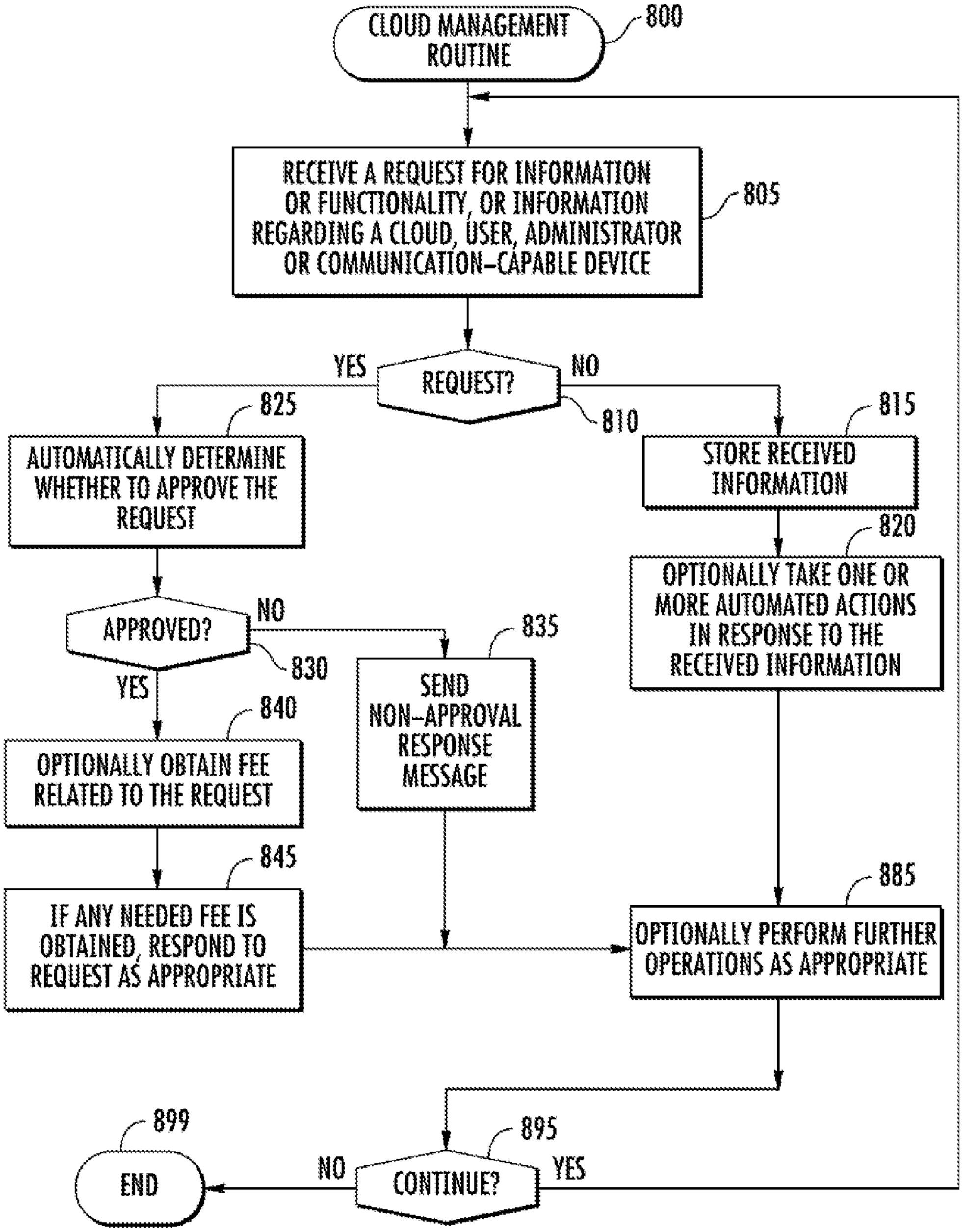
FIG. 8 is a flow diagram of an example embodiment of a Cloud Management routine.

FIG. 8 is a flow diagram of an example embodiment of a Cloud Management routine 800. The routine may be provided by, for example, execution of the Cloud Management system 740 of FIG. 7, such as to provide location-based information and functionality to people and computing devices in various ways.

The routine begins at step 805, where it receives a request for information or functionality related to clouds, or it receives information regarding one or more clouds, users, administrators or communication-capable devices. The routine continues to step 810 to determine whether information was received, and if so continues to step 815 to store the information. The information may include, for example, cloud configuration information from an administrator, information from or about a user (e.g., current user location; current user activity, including to check-in to a particular cloud or location associated with a cloud; user-supplied content; a user recommendation or rating; user preferences; etc.) from a communication-capable device, information about a communication-capable device (e.g., current device location), information about cloud management (e.g., votes from members of a cloud regarding whether to admit a new user to the cloud or to perform another type of activity), information from a company or other entity corresponding to a cloud (e.g., an offer to be made to members of the cloud), etc. The routine then continues to step 820 to optionally take one or more automated actions in response to the received information (e.g., to make user-supplied content or other information available to other cloud members in a specified or configured manner, to make supplied offers available to some or all current cloud members, to charge the supplier of an offer one or more associated fees, to determine whether cloud availability has changed for a user or device based on a change in location or other change in relevant attribute information, to notify a user or device of new availability to join a cloud, to determine whether to admit a new user to a cloud based on received votes from other cloud members, to analyze currently available user information to determine whether to modify points or related benefits for the user based on user activities or other information, to analyze currently available user activity information and/or user cloud membership information to determine particular patterns, to determine to perform one or more types of notifications to cloud members based on the received information and/or on other automated actions that are performed, etc.).

If it is instead determined in step 810 that a request is received, the routine continues to step 825 to automatically determine whether to approve the request. For example, some types of requests may always be approved, such as a request from a user for information about clouds available to the user and/or about prior cloud-related interactions by the user. In addition, if the request is from a user to join a cloud, the routine may automatically determine whether to approve the request based on whether the user location and other user attributes satisfy any admission criteria for the cloud. Alternatively, if the cloud configuration indicates that a decision to allow a user to join a cloud is based on a vote by other members of the cloud, the routine may automatically determine whether to approve the request by soliciting such votes from the other cloud members and analyzing them once received. If it is determined in step 830 that the request is not approved, the routine continues to step 835 to send a non-approval or error response message to the requester. Otherwise, after step 830 the routine continues to step 840 to optionally obtain a fee related to the request, if such a fee exists. If a fee exists and is obtained, or if no such fee is needed, the routine continues to step 845 to respond to the request as appropriate (e.g., to add a user to a group as requested, to provide search results or query results related to clouds to a user in response to a request for the information, to provide cloud-related information to a user who is a member of the cloud, to add information for a user such as a bookmark to another user, to forward a communication to another group member or to perform other user interactions for users in a cloud, etc.). While not illustrated in this embodiment, if a fee exists but is not obtained, the routine may in some embodiments proceed to step 835 to send an error message, or may instead perform the request without the fee.

After steps 820, 835 and 845, the routine continues to step 885 to optionally perform other operations as appropriate, such as to perform periodic housekeeping operations. For example, matches between user locations and clouds' geographic areas may be occasionally checked, such as to identify new ad hoc or other clouds that have become available for a user, previously available clouds that are no longer available, etc. After step 885, the routine continues to step 895 to determine whether to continue. If so, the routine returns to step 805, and if not continues to step 899 and ends.

Figure 9:
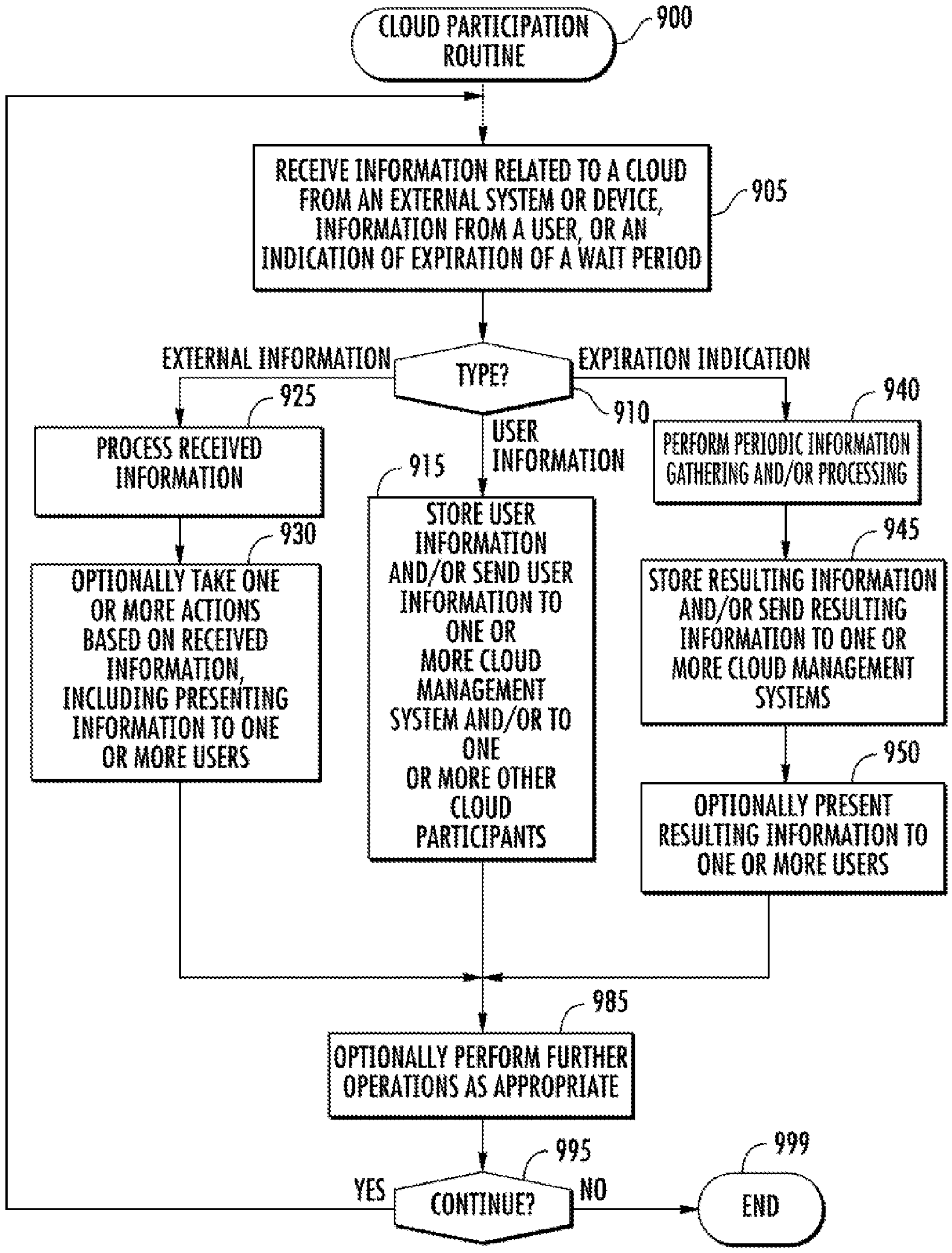
FIG. 9 is a flow diagram of an example embodiment of a Cloud Participation routine.

FIG. 9 is a flow diagram of an example embodiment of a Cloud Participation routine 900. The routine may be provided by, for example, execution of a program on a client device to enable participation by a user of the device in various cloud-related functionality, such as a program 753 of FIG. 7.

The routine begins in step 905, where it receives information from an external system or device (e.g., a cloud management system on a central server, a communication-capable device of another user in a cloud, etc.), information from a user, or an indication to perform periodic processing (e.g., based on expiration of a timer). If it is determined in step 910 that information from a user was received in step 905 (e.g., a request from the user for cloud-related search information or other cloud information, a request to join a cloud, a request to perform an indicated interaction with one or more other users who are cloud participants, a request to provide a vote response to the cloud management system, content or other information to be posted to one or more clouds for which the user is member, etc.), the routine continues to step 915 to store the received information and/or to send the received information to a cloud management system and/or device of another cloud participant. If it is instead determined in step 910 that external information was received in step 905 (e.g., previously requested information received from a cloud management system, a notification of availability to join a cloud or of other information of possible interest, information about an offer for cloud members, an indication from the cloud management system of points and/or related benefits that have been modified for the user for one or more clouds, a communication or other interaction request from another cloud participant, etc.), the routine continues to step 925 to process the received information, and in step 930 to optionally take one or more actions based on the received information (e.g., to display some or all of the received information to the user, such as if previously requested information is received).

If it is instead determined in step 910 to perform periodic processing, the routine continues to step 940 to gather and/or process information (e.g., current location information for a user or device, to determine whether any ad hoc clouds are available with other devices and users, etc.). The routine then continues to step 945 to store the resulting information and/or to send the resulting information to a cloud management system, such as to send information regarding a determined current location to the cloud management system. After step 945, the routine continues to step 950 to optionally present the resulting information to one or more users, such as to present information about an available determined ad hoc cloud. After steps 915, 930, or 950, the routine continues to step 985 to optionally perform other operations as appropriate, such as to perform housekeeping operations. After step 985, the routine continues to step 995 to determine whether to continue. If so, the routine returns to step 905, and if not continues to step 999 and ends.

While not illustrated here, a program on a device used by a cloud administrator may similarly perform a routine to provide various functionality to the cloud administrator, including to obtain information about new or modified cloud definitions from the administrator and to interact with a cloud management system to apply the cloud definitions.

As previously noted, in at least some embodiments, a user who is a member of a cloud may in some embodiments earn points for performing various activities, with such points then providing various types of benefits for the user (e.g., achieving various enhanced levels within that cloud or more generally within any clouds to which the user belongs, which may have corresponding benefits). For example, a user may earn points for checking in to a particular location associated with a cloud or for checking in to the cloud, for performing particular activities within or related to a cloud (e.g., engaging in a transaction at a cloud having an associated commercial location), etc. Awarding of points to a user may provide various benefits to the user, including in some embodiments providing one or more enhanced levels to the user within one or more clouds when a specified number of points is reached and/or one or more other specified criteria are achieved, with such enhanced levels having various associated benefits (e.g., to provide functionality or capabilities to the user that are not available to users who do not have that enhanced level, such as to remove others' content posted to the cloud, to direct particular types of messages to some or all members of the cloud, etc.; to provide functionality or capabilities to the user that other users who do not have that enhanced level can only access by paying a fee higher than that (if any) charged to the users with the enhanced levels; etc.). In addition, in some embodiments a user may also lose points and/or associated benefits for various reasons, including for not performing desired point-earning activities for a sufficient period of time and/or for performing undesired activities—the loss of associated benefits may in some embodiments including losing an enhanced level previously awarded to the user, ending a membership of a user within a cloud (e.g., based on the user not checking-in or otherwise participating in the cloud for a sufficient period of time, with the user optionally able to later rejoin the cloud if so desired in at least some such situations), etc.

As previously noted, in at least some embodiments, the cloud management system may analyze information about users and clouds in order to determine patterns of interest. For example, such analysis may determine that users who are members of a first cloud are also frequently members of a second cloud, that users who are members of the first cloud frequently visit a particular location that is not part of the first cloud, that users who are members of the first cloud frequently perform a specified type of activity outside of the first cloud, etc. Various types of data mining, recommendation generation (e.g., collaborative filtering) and other pattern analysis techniques may be used in various embodiments. In addition, such determined information may be used to provide various benefits, such as to recommend clouds to join, locations to visit, activities to perform, etc. to users based on their current cloud memberships and information about other related users. In addition, such determined information may be used to determine offers to make available, such as offers to enter chance-based contests, etc. to users based on their current cloud memberships and information about other related users. In addition, such determined information may be made available to users in various manners, including upon request by the users and/or by sending proactive notifications to users that are not in response to explicit corresponding user requests.

As previously noted, in at least some embodiments, the cloud management system may perform various notifications to users based on their current or potential future cloud membership, such as to proactively sent information to users that is not in response to explicit corresponding user requests. Such notifications to a user may include, for example, information about clouds for which the user is eligible to join (e.g., based on the user's current location and/or other attributes or characteristics of the user), information about activities of other users who are members of a common cloud (e.g., that one or more such cloud members are currently checked in to a particular location or are planning on going to a particular location), information about a new offer that is made for a cloud for which the user is a member (e.g., an offer to enter a chance-based contest), information about a new member joining a cloud for which the user is a member, information about a specified type of activity happening for a cloud for which the user is a member (e.g., a "trending event" involving several members checking in at a particular location within the cloud), information about a new recommendation or rating entered by a member of a cloud for which the user is a member, information about a current physical location of a member of a cloud for which the user is a member that is nearing a specified location of interest for the cloud, information about a pattern of interest determined for a cloud for which the user is a member, etc. As discussed in greater detail elsewhere, the users to notify for a particular type of information may be determined in various manners (e.g., based on cloud membership, for member users and/or non-member users within a specified distance of the cloud, etc.), and various types of mechanisms may be used to perform the notification.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. Accordingly, the invention is not limited except as by specified claims and the elements recited therein. In addition, while certain aspects of the invention are discussed in certain claim forms at certain times, the inventors contemplate the various aspects of the invention in any available claim form. For example, while only some aspects of the invention may be recited as being embodied in a computer-readable medium, other aspects may likewise be so embodied.

What is claimed is:

1. A computer-implemented method, comprising:

receiving, by one or more configured computing systems, an indication of a contest entry to a contest; and responding, by the one or more configured computing systems, to the indication of the contest entry by:

accessing a contest-definition database to determine a current value of a contest award counter associated with the contest, the contest award counter being a value stored in the contest-definition database, and the value of the contest award counter being incremented at a random or pseudo-random time;

determining an award result associated with the indication of the contest entry, the award result based on the determined current value of the contest award counter and comprising either an indication of a prize or an indication of no prize; and in an instance in which the award result comprises the indication of the prize, updating the contest award counter.

2. The computer-implemented method of claim 1, further comprising;

selectively incrementing the contest award counter, wherein the step of determining the current value of the contest award counter comprises reading the contest award counter and the step of updating information related to the contest award counter comprises decrementing the contest award counter.

3. The computer-implemented method of claim 2 wherein the step of selectively incrementing the contest award counter comprises determining times to increment the contest award counter during a contest time period.

4. The computer-implemented method of claim 3 wherein the step of determining times to increment the contest award counter comprises determining N time points distributed during a contest time period.

5. The computer-implemented method of claim 2 wherein the step of selectively incrementing the contest award counter comprises at least one of:

randomly incrementing the contest award counter during a contest time period; and pseudo-randomly incrementing the contest award counter during the contest time period.

6. The computer-implemented method of claim 2 wherein the step of selectively incrementing the contest award counter comprises:

determining a portion of the contest time period; and not incrementing the contest award counter during the determined portion of the contest time period.

7. The computer-implemented method of claim 6 wherein the step of selectively incrementing the contest award counter comprises at least one of:

randomly incrementing the contest award counter during another portion of contest time period; and pseudo-randomly incrementing the contest award counter during the another portion of the contest time period.

8. The computer-implemented method of claim 6 wherein the step of determining the portion of the contest time period is based on a probability of receiving an indication of a contest entry to the contest during the portion of the contest time period.

9. The computer-implemented method of claim 6, further comprising:

limiting receipt of contest entries to time periods when a business location associated with the contest is open, wherein the determined portion of the contest time period corresponds to time periods when the business location associated with the contest is closed.

10. The computer-implemented method of claim 1 wherein, the step of determining the current value of the contest award counter associated with the contest comprises determining the current value based on number of previous increment times associated with the contest award counter and a number of previously awarded prizes associated with the contest award counter, and the step of updating information related to the award counter comprises updating the number of previously award prizes associated with the contest award counter.

11. The computer-implemented method of claim 1 wherein the step of determining the current value of the contest award counter associated with the contest comprises determining a probability associated with a time when the indication of the contest entry is received.

12. The computer-implemented method of claim 11 wherein a determined probability associated with a first portion of a contest time period is different than a determined probability associated with a second portion of the contest time period.

13. The computer-implemented method of claim 12, wherein the determined probability associated with the first portion of the contest time period is zero.

14. The computer-implemented method of claim 1, further comprising:

receiving an indication of a subsequent contest entry to the contest; and responding, by the one or more configured computing systems, to the indication of the subsequent contest entry by:

determining the current value of the contest award counter;

determining an award result associated with the indication of the subsequent contest entry, the award result associated with the indication of the subsequent entry based on the determined current value of the contest award counter comprising either an indication of a prize or an indication of no prize; and in an instance in which the award result comprises the indication of the prize, updating the contest award counter.

15. The computer-implemented method of claim 1 wherein the contest award counter is one of a plurality of contest award counters associated with the contest, the method further comprising:

receiving an indication of a subsequent contest entry to the contest; and responding to the indication of the subsequent contest entry by:

selecting a contest award counter of the plurality of contest award counters;

determining a current value of the selected contest award counter;

determining an award result associated with the indication of the subsequent contest entry based on the determined current value of the selected contest award counter and comprising either an indication of a prize or an indication of no prize; and in an instance in which the award result comprises the indication of the prize, updating the contest award counter.

16. The computer-implemented method of claim 15 wherein the step of selecting the contest award counter of the plurality comprises at least one of:

selecting a contest award counter of the plurality of contest award counters based on a probability; and selecting a contest award counter of the plurality of contest award counters based on a previous selection of a contest award counter associated with a previous indication of a contest entry.

17. The computer-implemented method of claim 15, further comprising;

selectively incrementing respective contest award counters of the plurality, wherein the step of determining the current value of the selected contest award counter comprises reading the selected contest award counter and the updating information related to the selected contest award counter comprises decrementing the selected contest award counter.

18. The computer-implemented method of claim 1, further comprising:

in the instance in which the award result comprises the indication of the prize:

providing an indication of redemption instructions to claim the prize; and in response to receipt of an indication of a redemption request, determining whether the indication of the redemption request indicates compliance with the redemption instructions.

19. The computer-implemented method of claim 18 wherein the step of determining whether the indication of the redemption request indicates compliance with the redemption instructions comprises determining whether a timer has expired.

20. The computer-implemented method of claim 18 wherein when the step of determining whether the indication of the redemption request indicates compliance with the redemption instructions indicates non-compliance, the method further comprises updating the information related to the contest award counter based to reflect that the prize was not awarded.

21. The computer-implemented method of claim 1, further comprising:

determining a number of prizes remaining to be awarded in the contest at a time during the contest; and selectively initiating one or more actions based on the determined number of prizes remaining to be awarded.

22. The computer-implemented method of claim 21 wherein the step of selectively initiating one or more actions comprises comparing the determined number to a threshold number and selectively initiating the one or more actions based on the comparison.

23. The computer-implemented method of claim 22 wherein when the determined number is less than the threshold number, the step of selectively initiating one or more actions comprises increasing the number of prizes remaining to be awarded in the contest.

24. The computer-implemented method of claim 22 wherein when the determined number is greater than the threshold number, the step of selectively initiating one or more actions comprises randomly selecting a user associated with a previously submitted indication of a contest entry to award a prize remaining to be awarded in the contest.

25. The computer-implemented method of claim 1 wherein the step of responding to the received indication of the contest entry includes:

determining whether a user associated with the indication of the contest entry is eligible to enter the contest.

26. The computer-implemented method of claim 25 wherein the step of determining whether the user associated with the indication of the contest entry is eligible to enter the contest includes:

determining whether the user is a member of a location-based virtual group of users that has one or more associated geographical areas.

27. The computer-implemented method of claim 26 wherein the step of determining whether the user associated with the indication of the contest entry is eligible to enter the contest includes:

determining whether the user has complied one or more associated rules related to submission of contest entries by members of the location-based virtual group of users.

28. The computer-implemented method of claim 27 wherein the location-based virtual group is associated with a commercial entity that is associated with the contest.

29. The computer-implemented method of claim 28 wherein the step of determining whether the user has complied one or more associated rules related to submission of contest entries by members of the location-based virtual group of users includes determining whether the user has checked-in at a location associated with the commercial entity and located within the one or more associated geographical areas.

30. A computer program product comprising at least one non-transitory computer-readable storage medium having computer-executable program code portions stored therein, the computer-executable program code portions comprising program code instructions for:

receiving multiple indications of contest entries to a contest; and responding to each of a plurality of the received multiple indications of contest entries by, accessing a contest-definition database to determine a current value of a contest award counter associated with the contest, the contest award counter being a value stored in the contest-definition database, and the value of the contest award counter being incremented at a random or pseudo-random time;

determining an award result associated with the received indication of the contest entry, the award result based on the determined current value of the contest award counter and comprising either an indication of a prize or an indication of no prize; and in an instance in which the award result comprises the indication of the prize, updating the contest award counter.

31. The computer program product according to claim 30, wherein the computer-executable program code portions for responding to each received indication of the plurality further comprise program code instructions for;

selectively incrementing the contest award counter, wherein the determining the current value of the contest award counter comprises reading the contest award counter and the updating information related to the contest award counter comprises decrementing the contest award counter.

32. The computer program product according to claim 31, wherein the computer-executable program code portions for selectively incrementing the contest award counter further comprise program code instructions for:

determining a portion of the contest time period; and not incrementing the contest award counter during the determined portion of the contest time period.

33. The computer program product according to claim 32, wherein the computer-executable program code portions further comprise program code instructions for:

limiting receipt of contest entries to time periods when a business location associated with the contest is open, wherein the determined portion of the contest time period corresponds to time periods when the business location associated with the contest is closed.

34. The computer program product according to claim 30, wherein the contest award counter is one of a plurality of contest award counters associated with the contest, the responding to each of the plurality of the received multiple indications of contest entries including selecting the contest award counter from the plurality of contest award counters.

35. The computer program product according to claim 30, wherein the computer-executable program code portions for responding to each of the plurality of the received multiple indication of contest entries further comprise program code instructions for:

in the instance in which the award result comprises the indication of the prize, updating the contest award counter:

providing an indication of redemption instructions to claim the prize; and in response to receipt of an indication of a redemption request, determining whether the indication of the redemption request indicates compliance with the redemption instructions.

36. The computer program product according to claim 30, wherein the computer-executable program code portions further comprise program code instructions for:

determining a number of prizes remaining to be awarded in the contest at a time during the contest; and selectively initiating one or more actions based on the determined number of prizes remaining to be awarded.

37. The computer program product according to claim 30, wherein the computer-executable program code portions further comprise program code instructions for:

determining whether a user associated with one of the multiple received indications is eligible to enter the contest; and excluding the one of the multiple received indications from the plurality of indications when it is determined the user associated with the one of the multiple received indications is not eligible to enter the contest.

38. The computer program product according to claim 37, wherein the computer-executable program code portions for:

determining whether the user associated with the one indication of the multiple received indications is eligible to enter the contest further comprise program code instructions for:

determining whether the user is a member of a location-based virtual group of users that has one or more associated geographical areas.

39. A configured computing system comprising:

one or more processors; and a first component configured to, when executed by at least one of the one or more processors, facilitate functionality for awarding of prizes in a contest by responding to an indication of a contest entry by: accessing a contest-definition database to determine a current value of a contest award counter associated with the contest, the contest award counter being a value stored in the contest-definition database, and the value of the contest award counter being incremented at a random or pseudo-random time;

determining an award result associated with the indication of the contest entry, the award result based on the determined current value of the contest award counter and comprising either an indication of a prize or an indication of no prize; and in an instance in which the award result comprises the indication of the prize, updating the contest award counter.

40. The configured computing system of claim 39 wherein the first component is configured to:

selectively increment the contest award counter at determined times;

determine the current value of the contest award counter by reading the contest award counter; and update the information related to the contest award counter by decrementing the contest award counter.

41. The configured computing system of claim 39 wherein the first component consists of one or more means for performing the facilitating of the functionality for the awarding of prizes in the contest.

* * * * *